(12) United States Patent
Kanehiro et al.

(10) Patent No.: US 10,866,446 B2
(45) Date of Patent: Dec. 15, 2020

(54) METHOD OF PRODUCING A DISPLAY PANEL

(71) Applicant: Sharp Kabushiki Kaisha, Sakai (JP)

(72) Inventors: Masayuki Kanehiro, Sakai (JP); Youhei Nakanishi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 353 days.

(21) Appl. No.: 15/757,360

(22) PCT Filed: Aug. 26, 2016

(86) PCT No.: PCT/JP2016/074920
§ 371 (c)(1),
(2) Date: Mar. 3, 2018

(87) PCT Pub. No.: WO2017/038661
PCT Pub. Date: Mar. 9, 2017

(65) Prior Publication Data
US 2018/0239186 A1    Aug. 23, 2018

(30) Foreign Application Priority Data

Sep. 4, 2015 (JP) ................................. 2015-174616

(51) Int. Cl.
*G02F 1/1333* (2006.01)
*B24B 9/08* (2006.01)
(Continued)

(52) U.S. Cl.
CPC .......... *G02F 1/133351* (2013.01); *B24B 9/00* (2013.01); *B24B 9/08* (2013.01);
(Continued)

(58) Field of Classification Search
CPC ........ G09F 9/30; G02F 1/1343; G02F 1/1339; G02F 1/133351; G02F 1/1341;
(Continued)

(56) References Cited

U.S. PATENT DOCUMENTS 6,573,957 B1 * 6/2003 Suzuki ................ G02F 1/13336
349/110
2002/0196393 A1 * 12/2002 Tashiro ................ G02F 1/1303
349/106
(Continued)

FOREIGN PATENT DOCUMENTS

JP    2013-532304 A    8/2013
WO    2014/069529 A1   5/2014

*Primary Examiner* — Michael H Caley
*Assistant Examiner* — Agnes Dobrowolski
(74) *Attorney, Agent, or Firm* — Keating & Bennett, LLP

(57) ABSTRACT

A method of producing a liquid crystal panel includes a grinding process and a sealing process. The grinding process includes grinding at least one common liquid crystal panel including a liquid crystal layer, a pair of boards that sandwich the liquid crystal layer, and a frame-shaped sealing member sandwiched between the boards along the non-rectangular outline to remove a section of the sealing member and to leave a rest of the sealing member. The grinding process further includes forming a sealing member removed processed edge section of the common liquid crystal panel. The sealing member removed processed edge section includes edges of the boards corresponding to the section of the sealing member removed from the common liquid crystal panel. The sealing process includes applying a sealing resin to the sealing member removed processed edge section to fill a space between the edges of the board.

15 Claims, 19 Drawing Sheets

(51) Int. Cl.
| | |
|---|---|
| *G02F 1/1339* | (2006.01) |
| *G02F 1/1341* | (2006.01) |
| *B24B 9/00* | (2006.01) |
| *B24B 27/00* | (2006.01) |
| *B24B 41/06* | (2012.01) |
| *B24B 19/26* | (2006.01) |
| *B24B 27/06* | (2006.01) |
| *G02F 1/13* | (2006.01) |
| *G02F 1/1368* | (2006.01) |

(52) U.S. Cl.
CPC ............ *B24B 19/26* (2013.01); *B24B 27/003* (2013.01); *B24B 27/0616* (2013.01); *B24B 41/06* (2013.01); *G02F 1/1303* (2013.01); *G02F 1/1339* (2013.01); *G02F 1/1341* (2013.01); *G02F 1/1368* (2013.01); *G02F 2001/133354* (2013.01); *G02F 2201/501* (2013.01); *G02F 2201/56* (2013.01); *G02F 2202/28* (2013.01)

(58) Field of Classification Search
CPC ...... H01L 51/0076; H01L 51/004; C09J 5/00; C09J 133/14; B24B 9/08; B24B 41/06
See application file for complete search history.

(56) References Cited

U.S. PATENT DOCUMENTS

| | | | |
|---|---|---|---|
| 2005/0090186 A1* | 4/2005 | Uh | B24B 9/06 451/5 |
| 2008/0034797 A1* | 2/2008 | Lee | B24B 13/015 65/61 |
| 2011/0281489 A1 | 11/2011 | Tannas, Jr. | |
| 2013/0075357 A1 | 3/2013 | Tannas, Jr. | |
| 2013/0186853 A1* | 7/2013 | Sugimoto | G02F 1/133351 216/23 |
| 2014/0063424 A1* | 3/2014 | Sung | G02F 1/1339 349/122 |
| 2015/0293546 A1 | 10/2015 | Tanaka et al. | |
| 2016/0370635 A1 | 12/2016 | Tanaka et al. | |
| 2017/0351125 A1 | 12/2017 | Tannas, Jr. | |

\* cited by examiner

METHOD OF PRODUCING A DISPLAY PANEL

TECHNICAL FIELD

The present invention relates to a method of a producing display panel.

BACKGROUND ART

A display device that includes a liquid crystal panel for displaying images has been known. In the display device of this kind, the liquid crystal panel is normally in a rectangular shape. A technology for reducing a non-display area to a significantly narrow area is recently established. As disclosed in Patent Document 1, gate drivers are disposed inside pixels to be decentralized in a display area. According to the technology, flexibility in shape design of liquid crystal panels increases and thus liquid crystal panels having irregular shapes with rounded outlines and polygonal outlines (non-rectangular shapes) are provided. The liquid crystal panels having irregular shapes have irregularity not only in overall outlines but also in outlines of display areas, which may be rounded. Such liquid crystal panels are of current interest.

It is difficult to convert existing production facilities to production facilities for the liquid crystal panels having irregular shapes. Production processes and components need to be prepared exclusively for the liquid crystal panels according to the shapes. For example, a process of producing thin film transistor (TFT) array board, a process of producing a color filter (CF) board, a process of bonding the array board and the CF board together, and components are prepared exclusively for each shape of the liquid crystal panel having the irregular shape.

Patent Document 2 is a technical reference related to the present invention.

RELATED ART DOCUMENT

Patent Document

Patent Document 1: International Publication No. WO2014/069529
Patent Document 2: Japanese Translation of PCT International Application Publication No. JP-T-2013-52304

Problem to be Solved by the Invention

To produce liquid crystal panels in various irregular shapes, specialized production processes and components are required for different shapes, respectively, resulting in problems including high production costs.

Patent Document 2 suggests a technology for altering a size (or a shape) of a liquid crystal panel by cutting the liquid crystal panel having a quadrilateral shape. According to the technology disclosed in Patent Document 2, the liquid crystal panel having the quadrilateral shape is downsized to a liquid crystal panel having a quadrilateral shape in a smaller size but a liquid crystal panel having an irregular shape with a rounded outline cannot be produced.

DISCLOSURE OF THE PRESENT INVENTION

An object of the present invention is to provide a technology for efficiently producing liquid crystal panels in various irregular shapes.

Means for Solving the Problem

A method of producing a liquid crystal panel having a non-rectangular outline according the present invention includes a grinding process and a sealing process. The grinding process includes grinding at least one common liquid crystal panel including a liquid crystal layer, a pair of boards opposed to each other to sandwich the liquid crystal layer, and a frame-shaped sealing member that is sandwiched between the boards to fix the boards and surrounds the liquid crystal layer to seal the liquid crystal layer along a processing line defined along the non-rectangular outline to remove a section of the sealing member and to leave a rest of the sealing member. The grinding process further includes forming a sealing member removed processed edge section of the common liquid crystal panel such that the liquid crystal layer is exposed. The sealing member removed processed edge section includes edges of the boards corresponding to the sections of the sealing member removed from the common liquid crystal panel. The sealing process includes applying a sealing resin to the sealing member removed processed edge section to fill a space between the edges of the boards to seal the liquid crystal layer together with the rest of the sealing member. According to the method of producing a liquid crystal panel including the above processes according to the present invention, various irregular shapes of liquid crystal panels can be efficiently produced.

The grinding process of the method of producing a liquid crystal panel may include grinding the common liquid crystal panel that is sandwiched and held in a thickness direction of the common liquid crystal panel along the processing line. The common liquid crystal panel sandwiched and held in the thickness direction can be easily ground along the processing line.

The grinding process of the method of producing a liquid crystal panel may include holding the common liquid crystal panel by a clamping device that includes a pair of holding portion to be sandwiched between the holding portions in the thickness direction. With the clamping device, the common liquid crystal panel can be properly held.

The grinding process of the method of producing a liquid crystal panel may include sandwiching the common liquid crystal panel between protective boards, holding the common liquid crystal panel and the protective boards together, and grinding the common liquid crystal panel together with the protective board along the processing line. By grinding the common liquid crystal panel sandwiched between the protective boards together with the protective board, plate surfaces of the common liquid crystal panel are less likely to be damaged in the grinding process.

The sealing process of the method of producing a liquid crystal panel may include a curing process that includes applying the sealing resin that may be any one of a thermosetting resin, a photo-curable resin, and a thermosetting and photo-curable resin cured by heat and/or light and in an uncured state to the sealing member removed processed edge section and applying the heat and/or the light to the sealing resin to cure the sealing resin in the uncured state. The sealing resin that may be any one of the thermosetting resin, the photo-curable resin, and the thermosetting and photo-curable resin cured by heat and/or light is not cured unless the heat and/or the light is applied. Therefore, the sealing resin can be easily applied to the sealing member removed processed edge section in the sealing process.

The sealing process of the method of producing a liquid crystal panel may include applying the sealing resin to the sealing member removed processed edge section of the common liquid crystal panel that is sandwiched to be under presser in the thickness direction. The curing process may include applying the heat and/or the light to the sealing resin in the common liquid crystal panel that is released from the pressure in the thickness direction. When the sealing resin is applied to the sealing member removed processed edge section of the common liquid crystal panel under the pressure in the thickness direction and the pressure in the thickness direction is canceled, the uncured sealing resin having flowability and applied to the sealing member removed processed edge section is partially drawn into an internal space of the sealing member removed processed edge section to fill the internal space. When the curing process is performed in such a condition, the sealing resin that fills the internal space of the sealing member removed processed edge section is cured. Therefore, the sealing member removed processed edge section can be properly sealed.

The sealing resin used in the sealing process of the method of producing a liquid crystal panel may include different kinds of sealing resins. The sealing process may include applying the sealing resins to the sealing member removed processed edge section to form multiple layers.

The sealing resins used in the sealing process of the method of producing a liquid crystal panel may include an acrylic-based resin that may be directly applied to the sealing member removed processed edge section and an epoxy-based resin that is applied over the acrylic-based resin. With the sealing resins formed on the sealing member removed processed edge section, the sealing member removed processed edge section can have moisture resistance. Therefore, external moisture is less likely to pass through the sealing resins and reach the liquid crystal layer.

The method of producing a liquid crystal panel may include a moisture barrier attaching process that may include attaching a moisture barrier having an elongated shape to at least the sealing member removed processed edge section. The moisture barrier may include a section to cover at least the sealing member removed processed edge section and have moisture resistance and flexibility. With such a moisture barrier attached to the sealing member removed processed edge section, the liquid crystal panel can obtain moisture resistance. Therefore, external moisture is less likely to pass through the sealing resin and reach the liquid crystal layer.

The moisture barrier used in the moisture barrier attaching process may be a glass ribbon.

The at least one common liquid crystal panel may include common liquid crystal panels. The grinding process of the method of producing a liquid crystal panel may include collectively grinding the common liquid crystal panels that are layered in the thickness direction. By collectively grinding the common liquid crystal panels, productivity of the liquid crystal panels improves.

The grinding process of the method of producing a liquid crystal panel may include fixing the common liquid crystal panel together with adhesives disposed between the common liquid crystal panels not to be displaced from each other. The common liquid crystal panels that are fixed together not to be displace from each other can be collectively ground with ease. If the common liquid crystal panels are held by the clamping device, the common liquid crystal panels can be easily positioned relative to the clamping device.

The grinding process of the method of producing a liquid crystal panel may include applying the adhesives to areas of the common liquid crystal panel outside the processing line. The areas in which the adhesives are disposed are removed from the common liquid crystal panel in the grinding process. Therefore, a step for removing the adhesives is not required. Furthermore, the adhesives are less likely to contaminate front and back surfaces of the common liquid crystal panel.

The method of producing a liquid crystal panel may include a mother common liquid crystal panel producing process and a singulation process. The mother common liquid crystal panel producing process may include producing a mother common liquid crystal panel. The mother common liquid crystal panel may include common liquid crystal panels of the at least one common liquid crystal panel. The common liquid crystal panels may be arranged in a matrix. The singulation process may include cutting the mother common liquid crystal panel into the common liquid crystal panels to obtain the common liquid crystal panels. By collectively producing the common liquid crystal panels from the mother common liquid crystal panel, efficiency in production of the liquid crystal panels further improves.

One of the boards of the at least one common liquid crystal panel may be an array board that may include gate drivers. The gate drivers may be monolithically fabricated and disposed to be decentralized inside the frame-shaped sealing member. If the liquid panel includes such an array board, the liquid crystal panel having the non-rectangular outline can be easily produced.

Advantageous Effect of the Invention

According to the present invention, a technology for efficiently producing liquid crystal panels having various irregular shapes can be provided.

MODE FOR CARRYING OUT THE INVENTION

First Embodiment

A first embodiment of the present invention will be described with reference to FIGS. 1 to 12. In this section, a method of producing a liquid crystal panel 10 having a shape other than a rectangular (an irregular shape) and included in a liquid crystal display device will be described. X-axes, Y-axes, and Z-axes may be present in drawings. The axes in each drawing correspond to the respective axes in other drawings to indicate the respective directions. A front side and a rear side of the liquid crystal panel 10 are defined based on FIG. 2. Specifically, an upper side in FIG. 2 corresponds to a front side of the liquid crystal panel 10 and a lower side in FIG. 2 corresponds to a rear side (a back side) of the liquid crystal panel 10. An upper side and a lower side of a display area A1 of the liquid crystal panel 10 are defined based on FIG. 1. Specifically, an upper side in FIG. 1 corresponds to the upper side of the display area A1 of the liquid crystal panel 10 and a lower side in FIG. 1 corresponds to the lower side of the display area A1.

Figure 1:
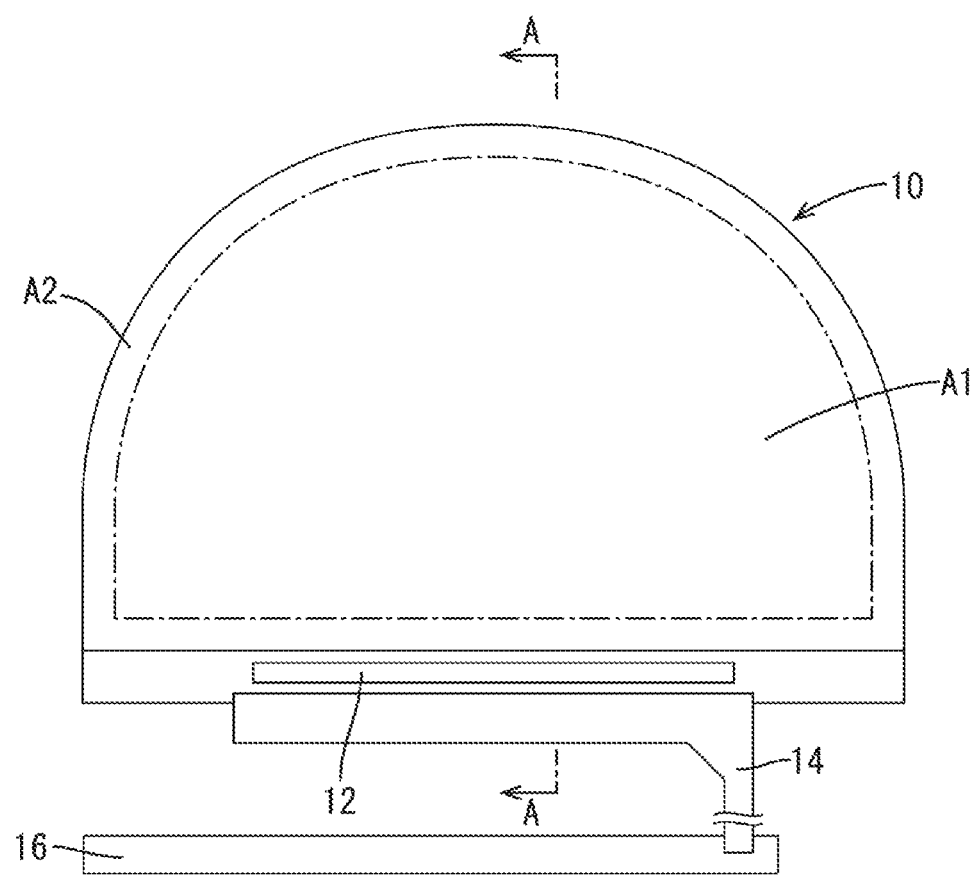
FIG. 1 is a schematic plan view of a liquid crystal panel according to a first embodiment of the present invention.
Figure 2:
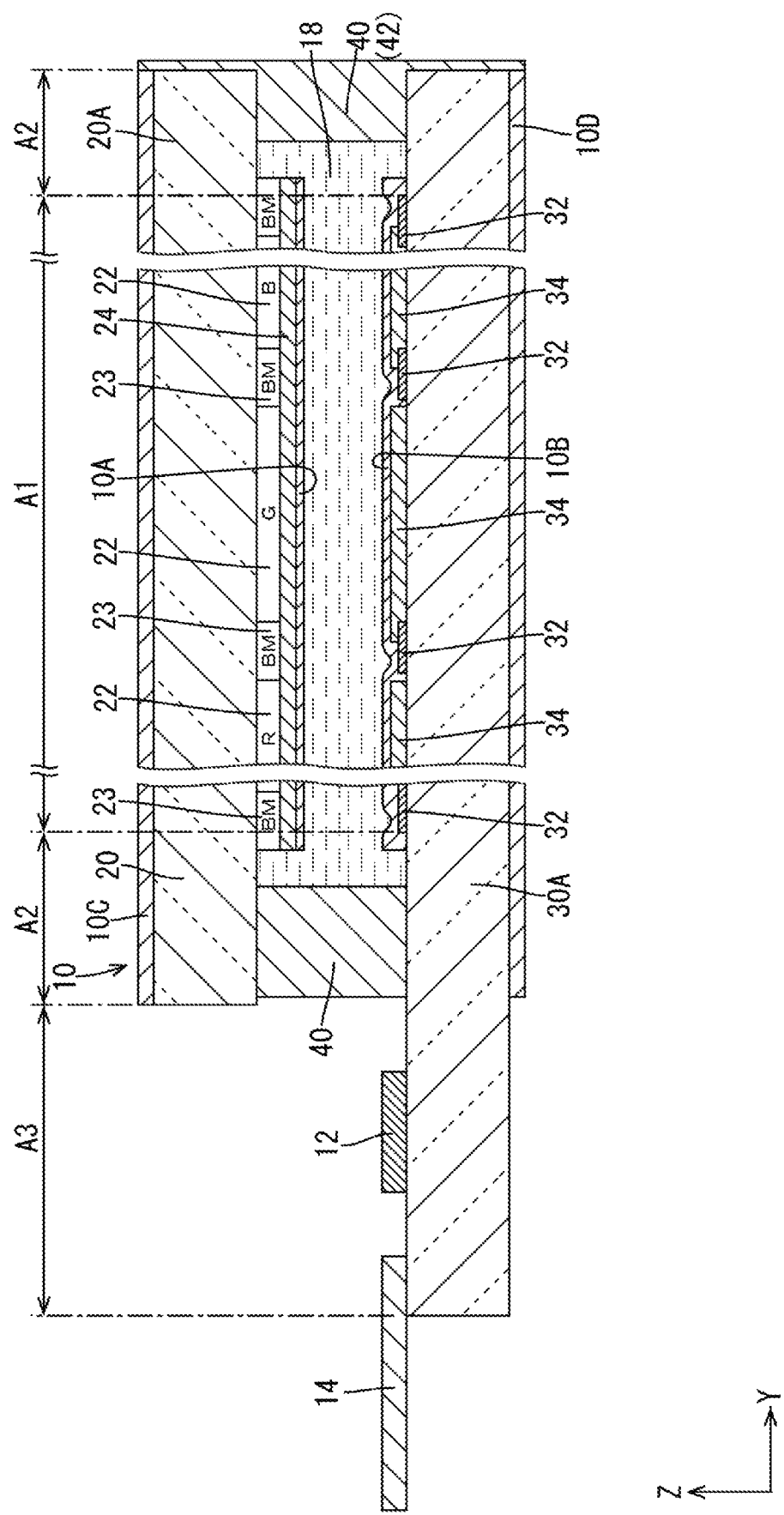
FIG. 2 is a cross-sectional view along line A-A in FIG. 1.

First, a configuration of the liquid crystal panel 10 will be described. FIG. 1 is a schematic plan view of the liquid crystal panel 10 according to the first embodiment. FIG. 2 is a cross-sectional view along line A-A in FIG. 1. As illustrated in FIG. 1, the liquid crystal panel 10 in this embodiment has an irregular (non-rectangular) overall shape with an outline that includes an arc-shaped curved section rather than a regular quadrilateral shape (a rectangular shape, a square shape) in a plan view.

More specifically, as illustrated in FIG. 1, an upper half of the liquid crystal panel 10 has an arc-shaped outline in the plan view and a lower half of the liquid crystal panel 10 has an outline similar to a section of a rectangle in the plan view. An overall shape of the liquid crystal panel 10 is semicircular. In this description, the upper half of the liquid crystal panel 10 may be referred to as a "semicircular section" and the lower half may be referred to as a "rectangular section" for the purpose of illustration. A section of the outline of the rectangular section of the liquid crystal panel 10 which linearly extends in the horizontal direction in FIG. 1 corresponds with the X-axis direction.

As illustrated in FIG. 1, a front surface of the liquid crystal panel 10 includes the display area A1 that has a curved outline along the outline of the liquid crystal panel 10. The display area A1 is a section of the front surface of the liquid crystal panel 10 in which images are displayed. The display area A1 occupies a large portion of the front surface of the liquid crystal panel 10. Outside the display area A1, a non-display area A2 is formed in a frame shape to surround the display area A1. The non-display area A2 is a section of the front surface of the liquid crystal panel 10 in which the images are not displayed. The non-display area A2 has a non-rectangular frame-like overall shape.

A section of the non-display area A2 closer to one of ends of the liquid crystal panel 10 with respect to the Y-axis direction (on a rectangular section side on the lower side in FIG. 1) is a mounting area A3 to which an IC chip 12 (a driver component) and a flexible circuit board 14 are mounted. The IC chip 12 is an electronic component (a driver) for driving the liquid crystal panel 10. The flexible circuit board 14 is a circuit board to connect a control circuit board 16 to the liquid crystal panel 10. The control circuit board 16 is configured to supply various input signals from the outside to the IC chip 12.

As illustrated in FIG. 1, the mounting area A3 is an area having a horizontally-long rectangular shape. The mounting area A3 is an edge section of the array board, which will be described later. In FIG. 1, a long direction of the mounting area A3 corresponds with the X-axis direction and a short direction of the mounting area A3 corresponds with the Y-axis direction.

As illustrated in FIG. 2, the liquid crystal panel 10 includes a pair of boards 20 and 30 having high light transmissivity and a liquid crystal layer 18 including liquid crystal molecules. One of the boards 20 and 30 on the front side is a color filter board (a CF board) 20. The other one of the boards 20 and 30 on the back side is an array board 30. The edge section of the array board 30 which corresponds to the rectangular section of the liquid crystal panel 10 projects from an edge of the CF board 20. The edge section of the array board 30 is defined as the mounting area A3. In the edge section of the array board 30, terminals (described later) to establish electrical connection with the IC chip 12 and the flexible circuit board 14 are provided.

The liquid crystal layer 18 is sandwiched between the boards 20 and 30. The liquid crystal molecules in the liquid crystal layer 18 are substances having optical characteristics that vary according to a change in orientation when an electric field is applied. Alignment films 10A and 10B are formed on inner surfaces of the boards 20 and 30 to orient the liquid crystal molecules in the liquid crystal layer 18 in a specified direction. Polarizing plates 10C and 10D are attached to outer surfaces of the boards 20 and 30, respectively.

The array board 30 includes a support substrate 30A made of glass, thin film transistors (TFTs) 32, and pixel electrodes 34. The TFTs 32 are switching components. The TFTs 32 and the pixel electrodes 34 that are connected to the TFTs 32 are arranged in a matrix on the inner surface of the support substrate 30A (on a liquid crystal layer 18 side). In the array board 20, traces including source traces, gate traces, and capacitance traces are routed to separate the TFTs 32 from one another. On a support substrate 30A, the gate drivers that are monolithically fabricated are disposed to be decentralized in the display area A1. The pixel electrodes 34 are formed from a transparent electrode film made of indium tin oxide (ITO) or zinc oxide (ZnO). An oxide semiconductor is used for active layers of the TFTs 32. The alignment film 10B is formed on the inner surface of the support substrate 30A to cover the TFTs 32 and the pixel electrodes 34. The terminals continued from the gate traces are disposed on the edge section of the rectangular section of the array board 30.

The CF board 20 include CFs 22 in red (R), green (G), and blue (B) arranged in a matrix on an inner surface side (on the liquid crystal layer 18 side) of the support substrate 20A made of glass. On the support substrate 20A, a light blocking layer 23 (a black matrix) is formed to separate the CFs 22 from one another. A common electrode 24 that is formed from a transparent conductive film is formed on the support substrate 20A to cover the CFs 22 and the light blocking layer 23. The alignment film 10A is formed on the inner surface of the support substrate 20A to cover the common electrode 24.

The CF board 20 and the array board 30 are bonded together via a sealing member 40 with the arc-shaped outlines aligned with each other and the edge section of the rectangular section of the array board 30 projecting from the edge of the rectangular section of the CF board 20. The sealing member 40 is formed to surround the liquid crystal layer 18 in the plan view along the outline of the CF board 20 in a semicircular frame-like shape as a whole. The area inside the sealing member 40 is the display area A1.

The sealing member 40 includes primary sealing members 41 that are used in a quadrilateral liquid crystal panel (a common liquid crystal panel) to produce the liquid crystal panel 10 and a secondary sealing member 42 that is additionally applied to the section from which the primary sealing member 41 is removed in a production process of the liquid crystal panel 10, which will be described later. The primary sealing members are known sealing members that are used in regular quadrilateral liquid crystal panels. The primary sealing members 41 may be known sealing members made of ultraviolet curable resin, thermosetting resin, or ultraviolet curable and thermosetting resin. The secondary sealing member 42 will be described in detail later.

In the liquid crystal panel 10, the a reference voltage is applied to the common electrode 24 on the CF board 20. By controlling a voltage applied to the pixel electrodes 34 is controlled by the TFTs 32, a predefined potential difference is created between the common electrode 24 and the pixel electrodes 34 and the liquid crystal molecules in the liquid crystal layer 18 are oriented in the predefined direction.

The liquid crystal panel 10 having the configuration described above and the non-rectangular shape is produced through grinding of the common liquid crystal panel 50 having the rectangular shape into a predefined shape. The method of producing the liquid crystal panel 10 using the common liquid crystal panel 50 will be described.

First, the common liquid crystal panel 50 will be described. The common liquid crystal panel 50 is a common component (a liquid crystal panel) used for producing liquid crystal panels in various irregular shapes. In this embodiment, the common liquid crystal panel 50 is used for producing the liquid crystal panel 10 in the semicircular shape.

Figure 3:
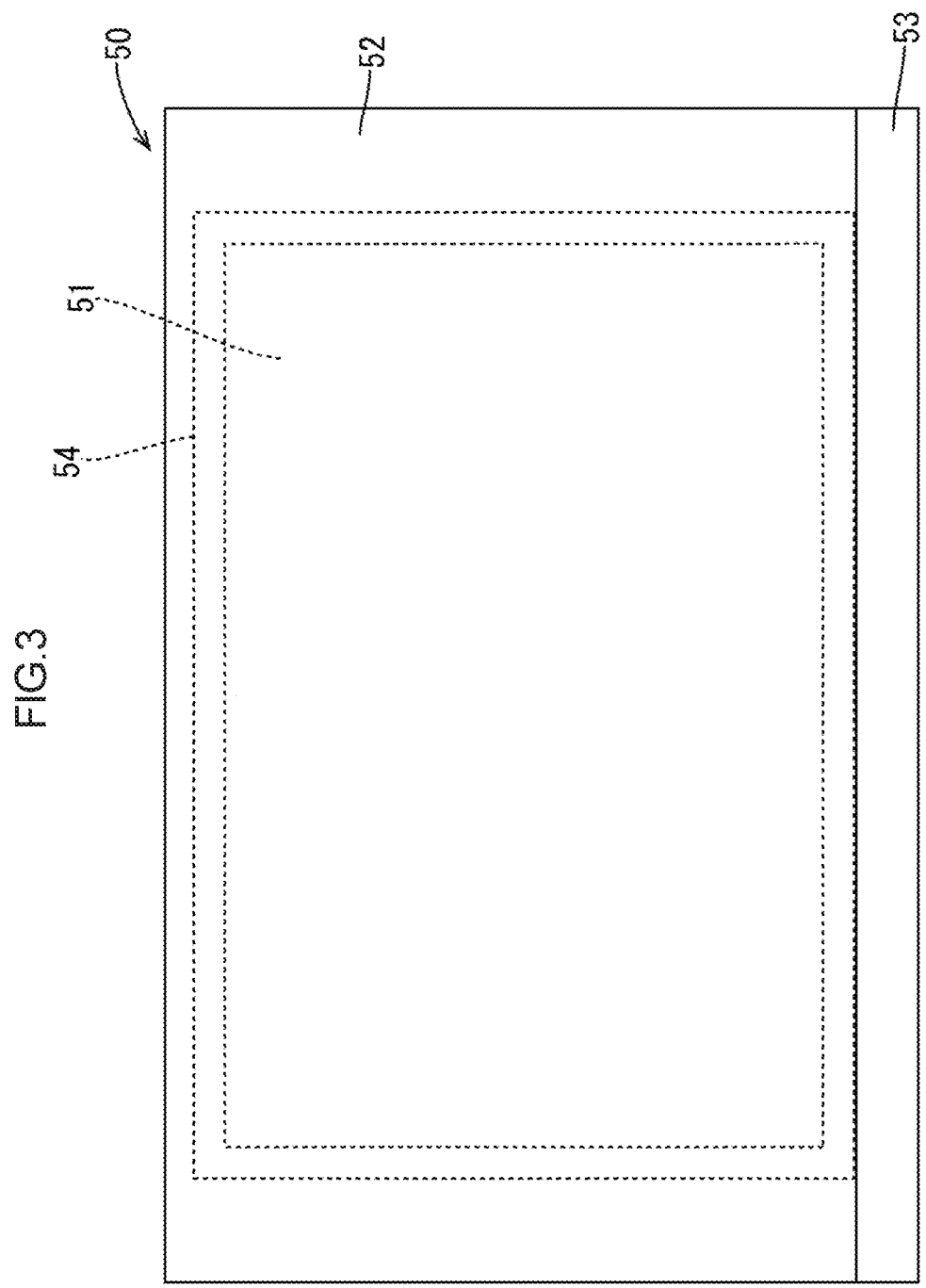
FIG. 3 is a plan view of a common liquid crystal panel.

FIG. 3 is a plan view of the common liquid crystal panel 50. As illustrated in FIG. 3, the common liquid crystal panel 50 in this embodiment has a horizontally-long rectangular shape in the plan view. The common liquid crystal panel 50 basically has a configuration similar to that of the liquid crystal panel 10. Namely, the common liquid crystal panel 50 has the configuration similar to that of the regular quadrilateral liquid crystal panel. The common liquid crystal panel 50 mainly includes a liquid crystal layer 51, a CF board 52 having a rectangular shape, an array board 53 having a rectangular shape, and a sealing member 54. The sealing member 54 surrounds the liquid crystal layer 51 and bonds the CF board 52 and the array board 53 together.

Figure 4:
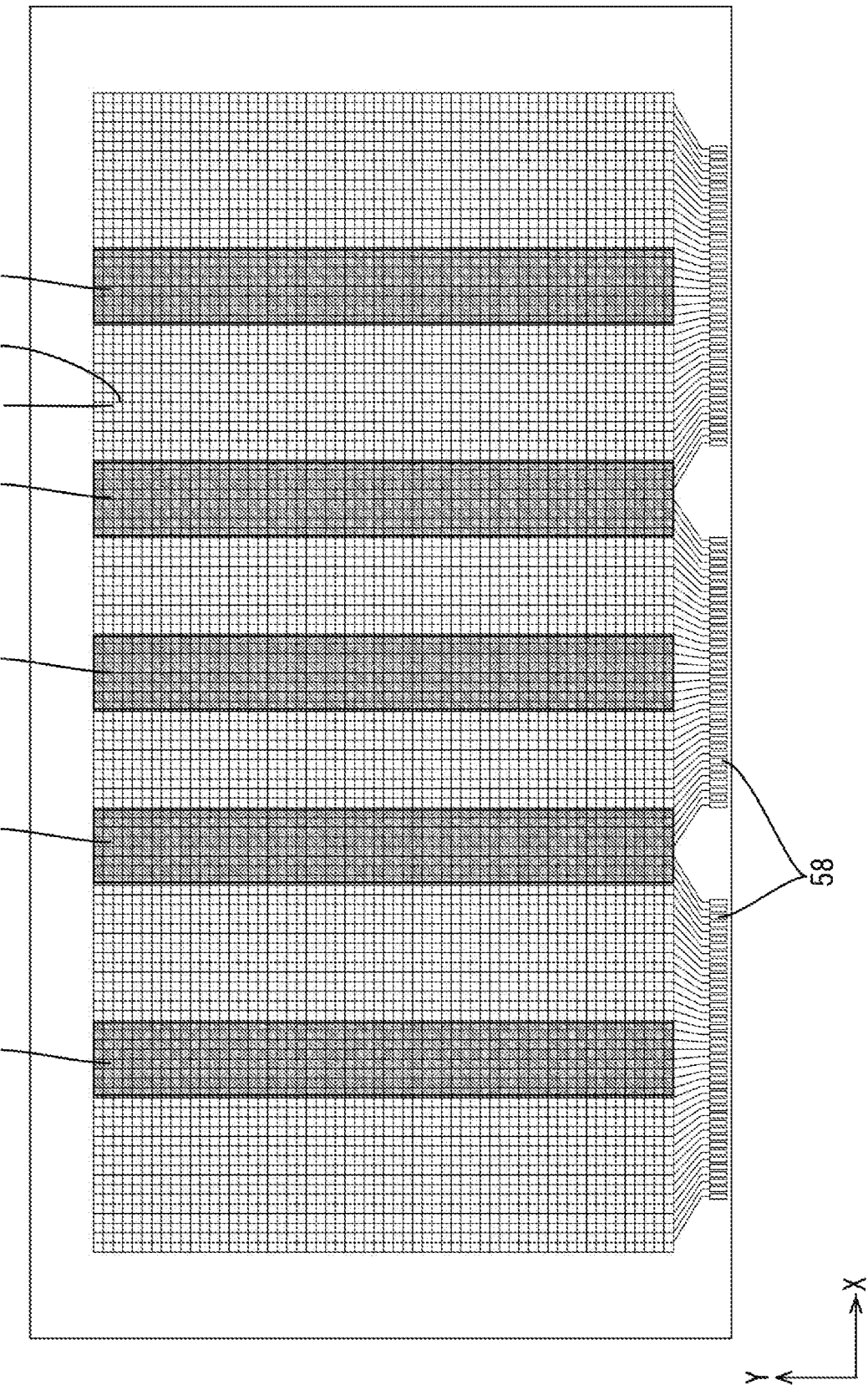
FIG. 4 is a plan view of an array board included in the common liquid crystal panel.

FIG. 4 is a plan view illustrating the array board 53 that is included in the common liquid crystal panel 50 viewed from the inner surface side. The array board 53 includes a support substrate 53A having a rectangular shape, traces formed on the support substrate 53A, and gate drivers 57 that are monolithically fabricated. The traces include gate traces 55 and source traces 56. The gate traces 55 are disposed parallel to one another along the long direction of the common liquid crystal panel 50 (the X-axis direction). The source traces 56 are disposed parallel to one another and perpendicular to the gate traces 55 along the short direction of the common liquid crystal panel 50 (the Y-axis direction).

The gate drivers 57 extend in the short direction of the common liquid crystal panel 50. The gate drivers 57 are disposed in band-shaped areas that are arranged at intervals in the long direction of the common liquid crystal panel 50. The gate drivers 57 are disposed to be decentralized in the band-shaped areas. The pixel electrodes are arranged in a matrix to be surrounded by the gate traces 55 and the source traces 56. One of the long edge sections of the support substrate 53A is to be defined as the mounting area A3 of the liquid crystal panel 10. Terminals 58 that continue from the gate traces 55 are provided in the long edge section. The array board 53 is bonded to the CF board 52 via the sealing member 54 such that the edge section in which the terminals 58 are provided projects outward from the CF board 52. Sections of the sealing member 54 are to be defined as the primary sealing members 41 in the liquid crystal panel 10.

Next, processes through which common liquid crystal panels 50 are produced will be described. The common liquid crystal panels 50 are collectively produced in a form of a board (a mother common liquid crystal panel producing process), similarly to the regular quadrilateral liquid crystal panels. The common liquid crystal panels 50 are arranged in a matrix within the board. The board that includes the common liquid crystal panels 50 is cut and individual common liquid crystal panels 50 are obtained (a singulation process). In this description, the board that include the common liquid crystal panels 50 arranged in the matrix is referred to as a mother common liquid crystal panel 60. The processes of producing the common liquid crystal panels 50 will be described with reference to FIGS. 5 to 8.

Production of Mother CF Board

Figure 5:
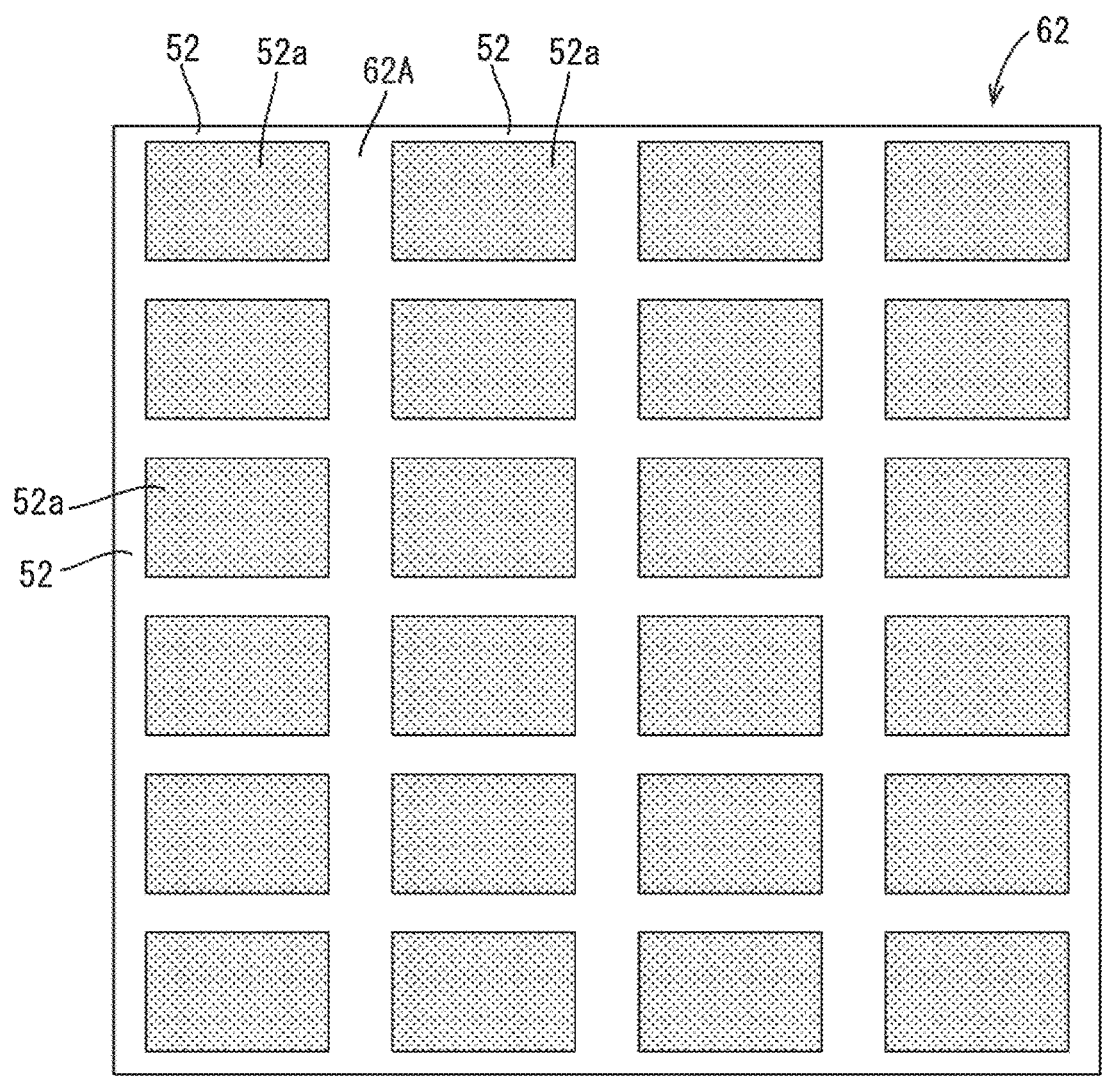
FIG. 5 is a plan view of a mother CF board.

FIG. 5 is a plan view of a mother CF board 62. The mother CF board 62 includes the CF boards 52 that are collectively produced in a matrix form. In the mother CF board 62, color filter laminates 52a are arranged in a matrix on a mother support substrate 62A that is made of glass. The color filter laminates 52a are laminates that include support substrates 52A (20A) of the CF boards 52 (20), CFs 22 formed on the support substrates 52A (20A), the light blocking layers 23, and common electrodes 24. To form the color filter laminates 52a, a known technology such as a photolithography technology may be used.

Production of Mother Array Board

A mother array board 63 includes the array boards 53 that are collectively produced in a matrix form. In the mother array board 63, array laminates are arranged in a matrix on a mother support substrate that is made of glass. The array laminates are laminates that include support substrates of the array boards 53 (30), TFTs 32 formed on the support substrates, pixel electrodes 34, traces including gate traces, and the gate drivers 57. To form the array laminates, similarly to the color filter laminates 52a, a known technology such as a photolithography technology may be used.

Formation of Alignment Films

Alignment films that are made of polyimide are formed to cover the color filter laminates 52a of the mother CF board 62 and the array laminates of the mother array board 63. Orientation processing such as application of light is performed on each alignment film. The alignment film formed on the color filter laminates 52a turns out to be the alignment films 10A of the CF boards 20 in the liquid crystal panels 10. The alignment film formed on the array laminates turns out to be the alignment films 10B of the array boards 30 in the liquid crystal panels 10.

Drawing of Sealing Member

Figure 6:
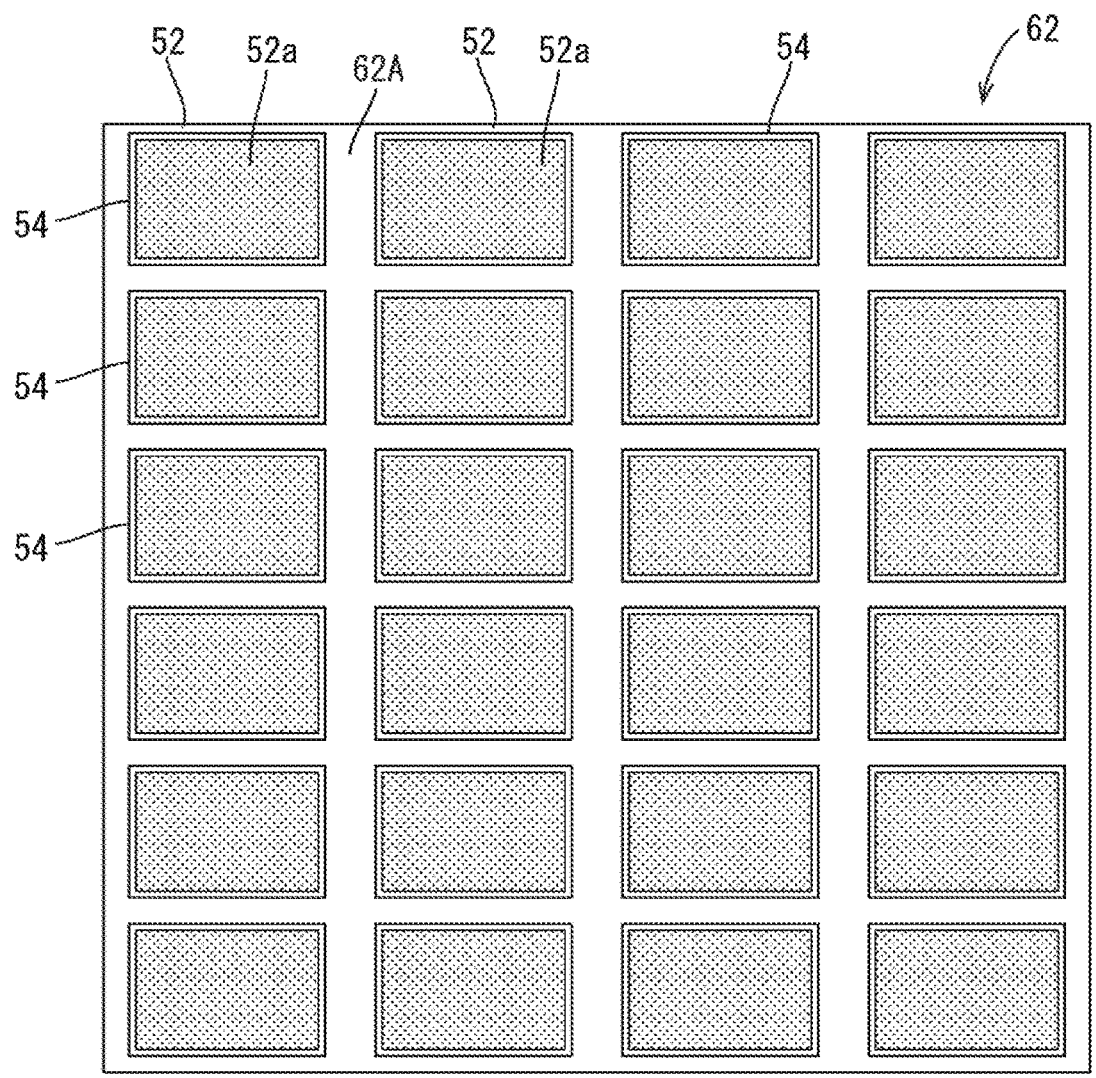
FIG. 6 is an explanatory view illustrating the mother CF board including sealing members formed on CF boards, respectively.

FIG. 6 is an explanatory view illustrating the mother CF board 62 with sealing members 54 formed on the CF boards 52, respectively. Each sealing member 54 has a quadrilateral frame shape in the plan view. The sealing members 54 are formed on the mother support substrate 62A to surround the color filter laminates 52a, respectively. The sealing members 54 are formed using a predefined drawing device. The sealing members 54 formed on the mother CF board 62 are photo-curable and thermosetting type sealing members. At this stage, the sealing members 54 are not cured.

Drop of Liquid Crystals

Figure 7:
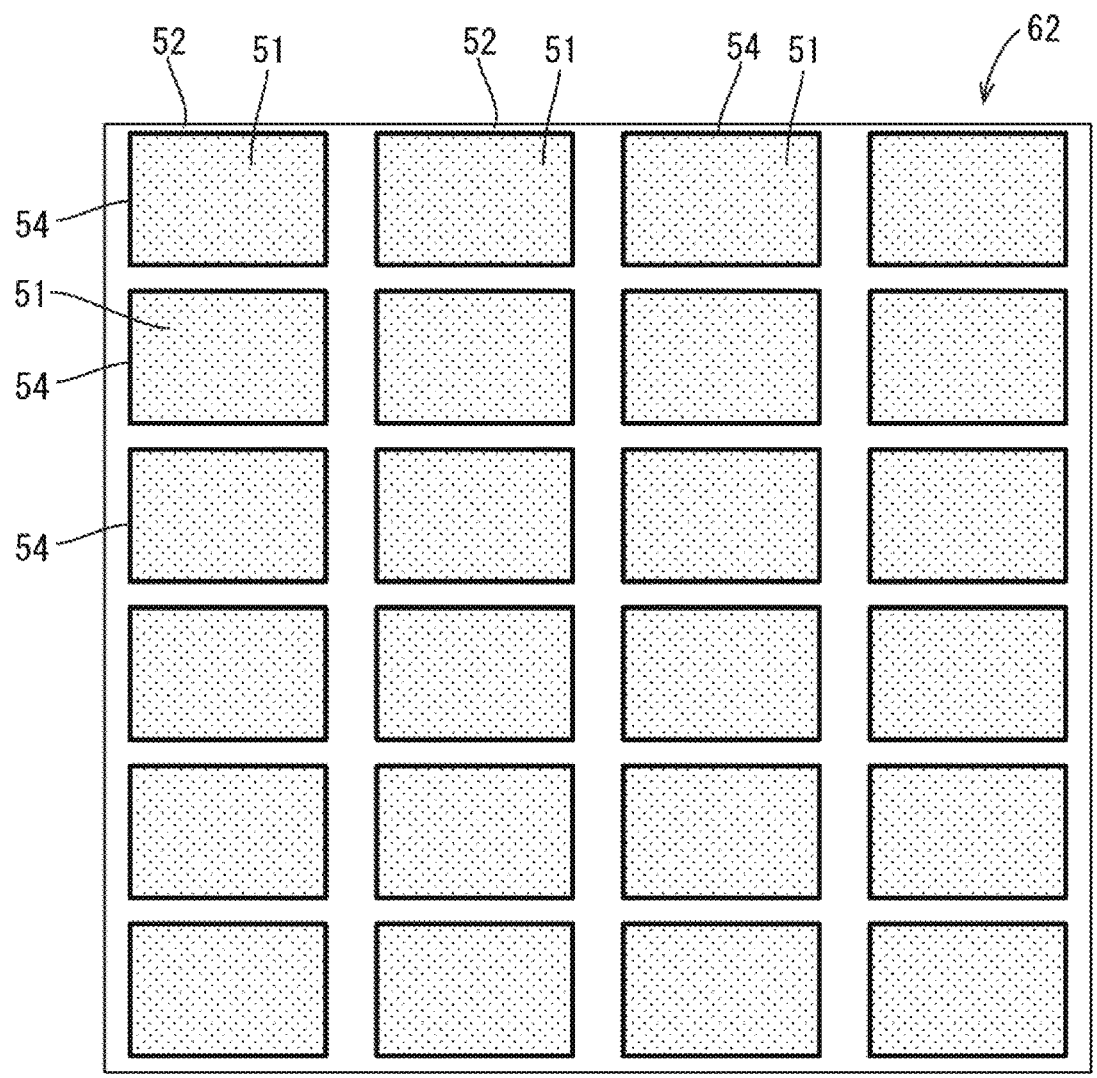
FIG. 7 is an explanatory view illustrating liquid crystal layers formed by dropping liquid crystals in areas of the CF boards inside the sealing members, respectively.

FIG. 7 is an explanatory view illustrating liquid crystal layers 51 formed by dropping liquid crystals in areas of the CF boards 52 inside the sealing members 54, respectively. The liquid crystals for the liquid crystal layers 51 are fed into the areas inside the sealing members 54 that are formed in frame shapes on the mother CF board 62 (the mother support substrate 62A) by the one drop fill (ODF) method using a predefined liquid crystal dropping device.

Bonding of Mother CF Board and Mother Array Board

Figure 8:
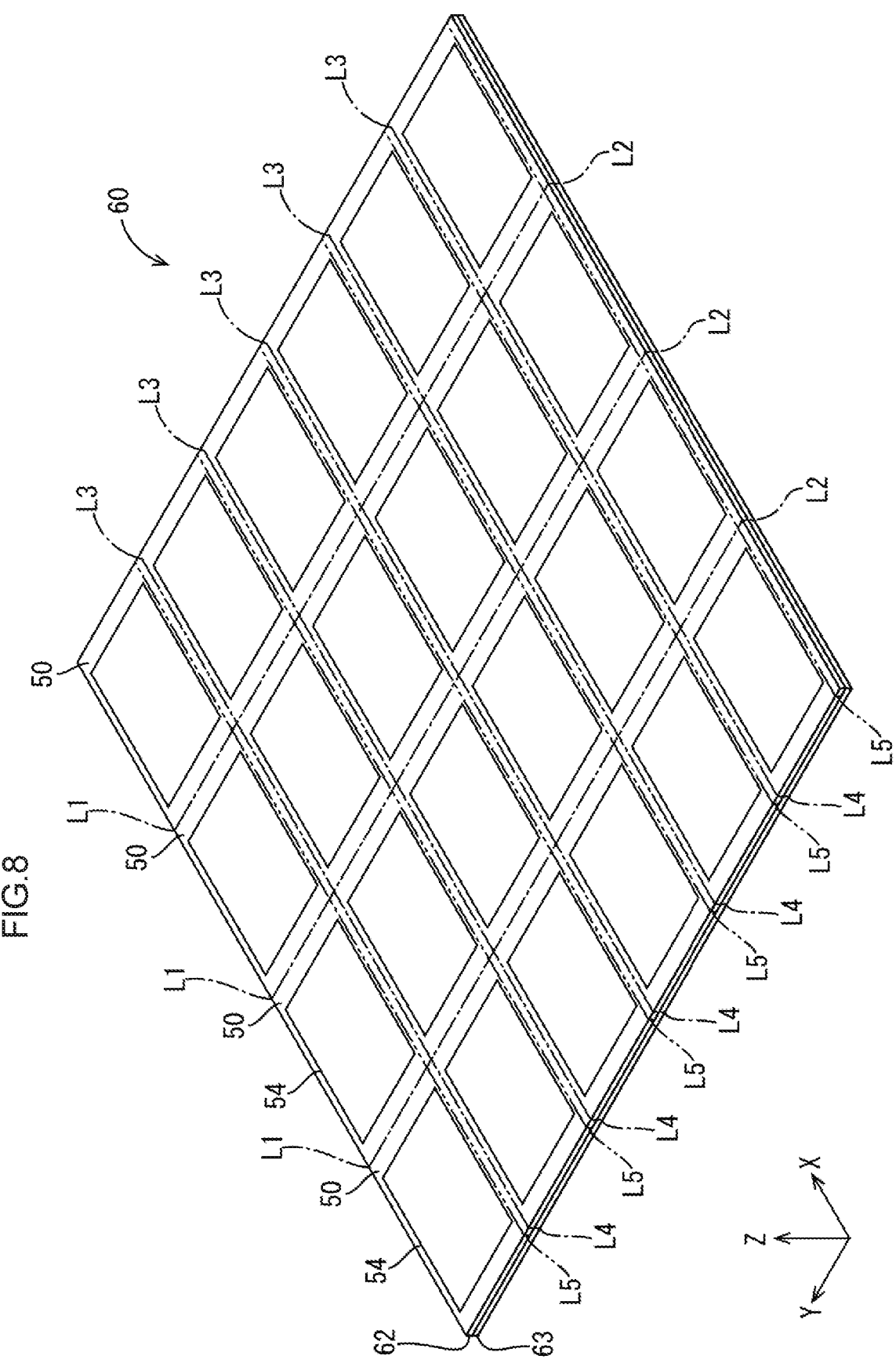
FIG. 8 is a perspective view of a mother common liquid crystal panel.

As illustrated in FIG. 7, after the liquid crystal layers 51 are formed on the mother CF board 62, the mother CF board 62 and the mother array board 63 are bonded together via the sealing members 54 using a predefined bonding device. During the bonding, ultraviolet rays are applied to the sealing members 54 through the mother CF board 62 or the mother array board 63 and heat is applied to the sealing members 54. As a result, the sealing members 54 are cured and the mother CF board 62 and the mother array board 63 are fixed together via the sealing members 54. The mother CF board 62 and the mother array board 63 are bonded together and the mother common liquid crystal panel 60 illustrated in FIG. 8 is obtained. FIG. 8 is a perspective view of the mother common liquid crystal panel 60. The mother CF board producing process, the mother array board producing process, and the mother CF board and mother array board bonding process are included in the mother common liquid crystal panel producing process.

Common Liquid Crystal Panel Singulation

The mother common liquid crystal panel 60 prepared as described above is cut and divided into the common liquid crystal panels 50 (the singulation process). In FIG. 8, scribe lines L1 to L4 are defined on the mother common liquid crystal panel 60. Scribe lines L1 to L4 are imaginary lines for cutting the mother common liquid crystal panel 60 into the common liquid crystal panels 50. Scribe lines L1 to L4 are set on the mother CF board 62 and the mother array board 63 for defining the common liquid crystal panels 50.

Scribe lines L1 are for cutting the mother CF board 62 along the short direction of the common liquid crystal panels 50 (the Y-axis direction). Scribe lines L1 are set along the short direction. Scribe lines L2 are for cutting the mother array board 63 along the short direction of the common liquid crystal panels 50 (the Y-axis direction). Scribe lines L2 are set along the short direction. Scribe lines L3 are for cutting the mother CF board 62 along the long direction of the common liquid crystal panels 50 (the X-axis direction). Scribe lines L3 are set along the long direction. Scribe lines L4 are for cutting the mother array board 63 along the long direction of the common liquid crystal panels 50 (the X-axis direction). Scribe lines L4 are set along the long direction. Scribe lines L1 and scribe lines L3 are perpendicular to each other on the mother CF board 62. Scribe lines L2 and scribe lines L4 are perpendicular to each other on the mother array board 63.

The mother common liquid crystal panel 60 is cut into the common liquid crystal panels 50 along scribe lines L1 to L4, which are set as described above, using a specific scribing device (e.g., a scribing device that includes a wheel shaped rotary blade). Scribe lines L5 are set on the mother CF board 62 of the mother common liquid crystal panel 60 for exposing edge sections of the array boards 53 on which the terminals are provided. When the common liquid crystal panels 50 are separated from one another and the edge sections of the CF boards 52 of the common liquid crystal panels 50 are cut off along the scribe lines L5, the common liquid crystal panels 50 that include the array boards 53 with the exposed edge sections are obtained.

The common liquid crystal panels 50 are produced from the mother common liquid crystal panel 60 as described above. Next, a process of producing the liquid crystal panel 10 having the semicircular shape as described above by grinding the common liquid crystal panels 50 will be described.

Grinding of Common Liquid Crystal Panel

Figure 9:
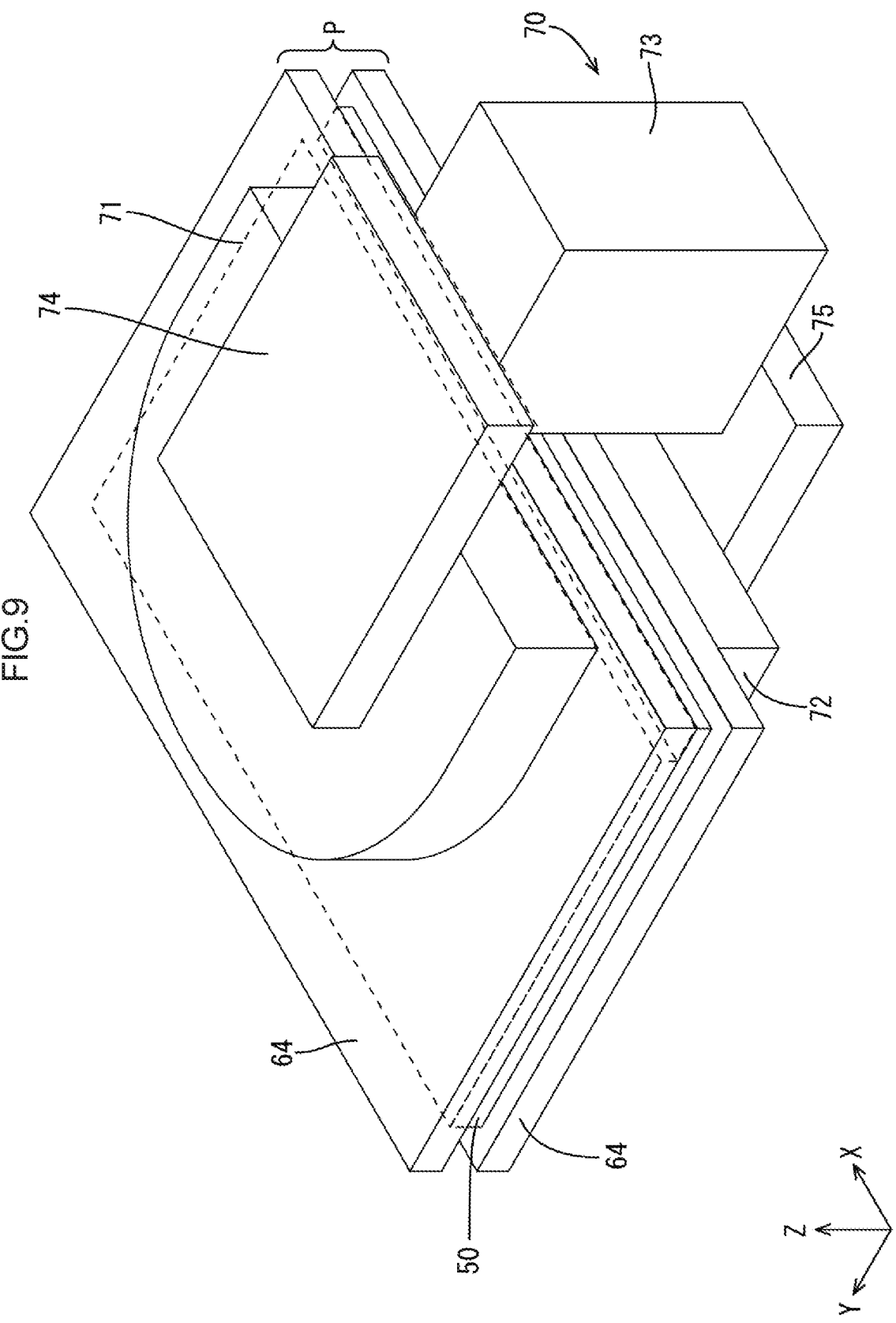
FIG. 9 is a perspective view of a clamping jig holding the common liquid crystal panel.

The liquid crystal panel 10 having the irregular shape is prepared by removing an unnecessary section (a margin) from the common liquid crystal panel 50 having the quadrilateral shape through grinding. FIG. 9 is a perspective view of a clamping jig 70 (a clamping device) holding the common liquid crystal panel 50. As illustrated in FIG. 9, the common liquid crystal panel 50 is processed while being held with the clamping jig 70. The common liquid crystal panel 50 is held with the clamping jig 70 such that the common liquid crystal panel 50 is sandwiched between portions of the clamping jig 70 in a thickness direction of the clamping jig 70 is less likely to be displaced. Furthermore, air bubbles or foreign substances are less likely to enter into the liquid crystal layer of the common liquid crystal panel 50.

The common liquid crystal panel 50 is sandwiched between dummy boards 64 made of glass (protective substrates) from the front surface side and the back surface side and held by the clamping Jig 70. The dummy boards 64 are used to protect the front and the back surfaces of the common liquid crystal panel 50 from damages during the processing of the common liquid crystal panel 50. Each dummy board 64 has a horizontally-long quadrilateral shape in a plan view similar to the common liquid crystal panel 50. The dummy board 64 has a plate surface that is slightly larger than the plate surface of the common liquid crystal panel 50 and a thickness (a board thickness) which is larger than the thickness (the board thickness) of the common liquid crystal panel 50.

The common liquid crystal panel 50 that is sandwiched between the dummy boards 64 is disposed such that the edges are located inner than the edges of the dummy boards 64. The dummy boards 64 may be temporary attached to the common liquid crystal panel 50 with an ultraviolet curable adhesive. To temporarily attach the dummy boards 64 to the common liquid crystal panel 50 with the adhesive, the adhesive is disposed in the margin of the of the common liquid crystal panel 50 which is eventually removed. By disposing the adhesive in the margin, the surfaces of the common liquid crystal panel 50 after the grinding (the liquid crystal panel 10) is less likely to be stained.

The common liquid crystal panel 50 is positioned relative to the clamping jig 70 using alignment marks, which are not illustrated, while being sandwiched between the dummy boards 64. Furthermore, the common liquid crystal panel 50 is the portions of the clamping jig 70 in the thickness direction and held by the clamping jig 70 while being sandwiched between the dummy boards 64.

As illustrated in FIG. 9, the clamping jig 70 includes an upper plate 71, a lower plate 72, a post 73, an upper connecting plate 74, and a lower connecting plate 75. The upper plate 71 and the lower plate 72 hold the common liquid crystal panel 50 that is sandwiched between the dummy board 64 (may be referred to as a panel laminate P) from the upper side and the lower side, respectively. The post 73 is disposed outer than the panel laminate P to extend in a direction in which layers of the panel laminate P are placed. The upper connecting plate 74 connects the top surface of the upper plate 71 to the upper end of the post 73. The lower connecting plate 75 connects the bottom surface of the lower plate 72 to the lower end of the post 73. In this description, the upper plate 71 and the lower plate 72 are holding portions to sandwich the common liquid crystal panel 50 that are sandwiched between the dummy boards 64 (the panel laminate P).

Figure 10:
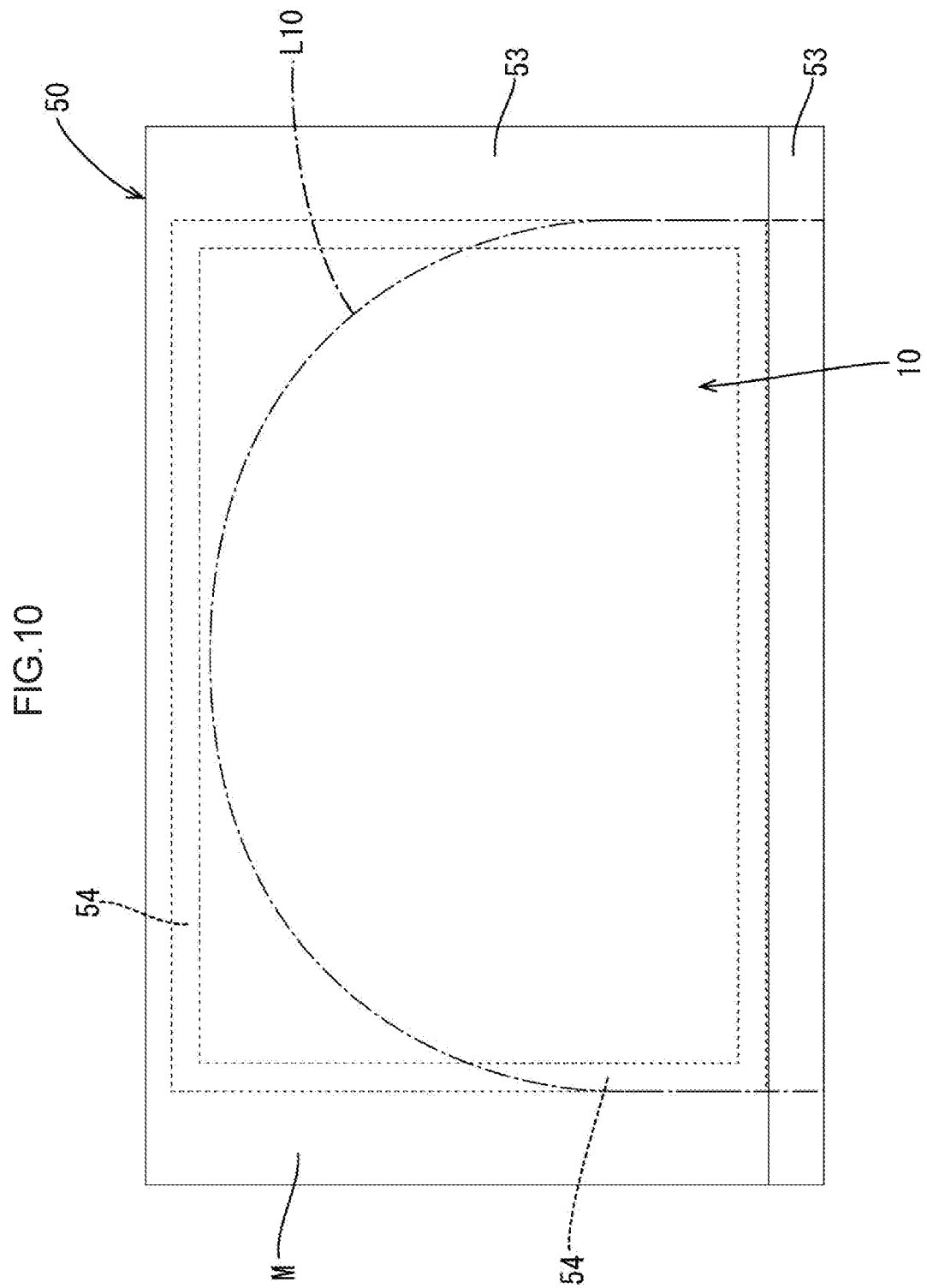
FIG. 10 is a plan view of the common liquid crystal panel with a processing line along an outline of the liquid crystal panel.

Each of the upper plate 71 and the lower plate 72 has a semicircular shape in a plan view. FIG. 10 is a plan view of the common liquid crystal panel 50 with processing line L10 along the outline of the liquid crystal panel 10. Processing line L10 extends along the outline of the liquid crystal panel 10, that is, has a semicircular arc shape as illustrated in FIG. 10. Processing line L10 is mainly along the curved section of the outline of the liquid crystal panel 10. The upper plate 71 and the lower plate 72 of the clamping jig 70 are slightly smaller than the liquid crystal panel 10 and disposed inside processing line L10. The upper plate 71 and the lower plate 72 are held against the upper dummy board 64 and the lower dummy board 64. A space between processing line L10 and the outer edge of the upper plate 71 or the outer edge of the lower plate 72 may be set as appropriate, for example, about 0.2 mm to 10 mm.

The common liquid crystal panel 50 is ground together with the dummy boards 64 along processing line L10. A grinding device (e.g., a device that includes rotary columnar grindstone for grinding an object) is used for the grinding of the common liquid crystal panel 50.

As illustrated in FIG. 10, processing line L10 in this embodiment is set to cross the sealing member 54 having the quadrilateral frame shape. Namely, a section of the sealing member 54 is ground and removed by the grinding device. A section of the liquid crystal layer enclosed with the sealing member 54 having the frame shape is removed through the grinding. A section of the common liquid crystal panel 50 inside processing line L10 is the liquid crystal panel 10 having the semicircular shape. A section of the common liquid crystal panel 50 outside processing line L10 is a margin M that is to be removed from the common liquid crystal panel 50.

During the grinding of the common liquid crystal panel 50 together with the dummy boards 64 along processing line L10, the common liquid crystal panel 50, or the panel laminate P (i.e., the common liquid crystal panel 50 sandwiched between the dummy boards 64), is sandwiched between the upper plate 71 and the lower plate 72 of the clamping jig 70. Namely, the common liquid crystal panel 50 is under pressure in the vertical direction. Therefore, even when the margin M including the section of the sealing member 54 is separated from the liquid crystal panel 10 section, air bubbles or foreign substances such as grinding debris are less likely to enter into the liquid crystal layer 51 of the common liquid crystal panel 50 (the liquid crystal layer 18 of the liquid crystal panel 10) inside the sealing member 54.

When the margin M is removed from the common liquid crystal panel 50 through the grinding process, the common liquid crystal panel 50 having the semicircular outline and being held by the clamping jig 70 is obtained. The dummy boards 64 are also processed into a semicircular shape similar to the common liquid crystal panel 50.

Sealing of Liquid Crystal Layer with Secondary Sealing member

After the margin M is removed from the common liquid crystal panel 50 as described above, the section of the sealing member 54 having the quadrilateral frame shape is removed. Therefore, the section of the liquid crystal layer 51 between the CF board 52 and the array board 53 in the common liquid crystal panel 50 is exposed to the outside. A sealing member removed processed edge section 50A of a processed edge of the common liquid crystal panel 50 is formed through the removal of the section of the sealing member 54. To seal the exposed section of the liquid crystal layer 51 between the edge of the CF board 52 and the edge of the array board 53, a sealing member 42 is additionally applied. The sealing member 42 that is additionally applied is referred to as the secondary sealing member 42 in this description. The sections of the sealing member 54 having the frame shape in the common liquid crystal panel 50 which are not removed through the grinding process are referred to as the primary sealing members 41.

Figure 11:
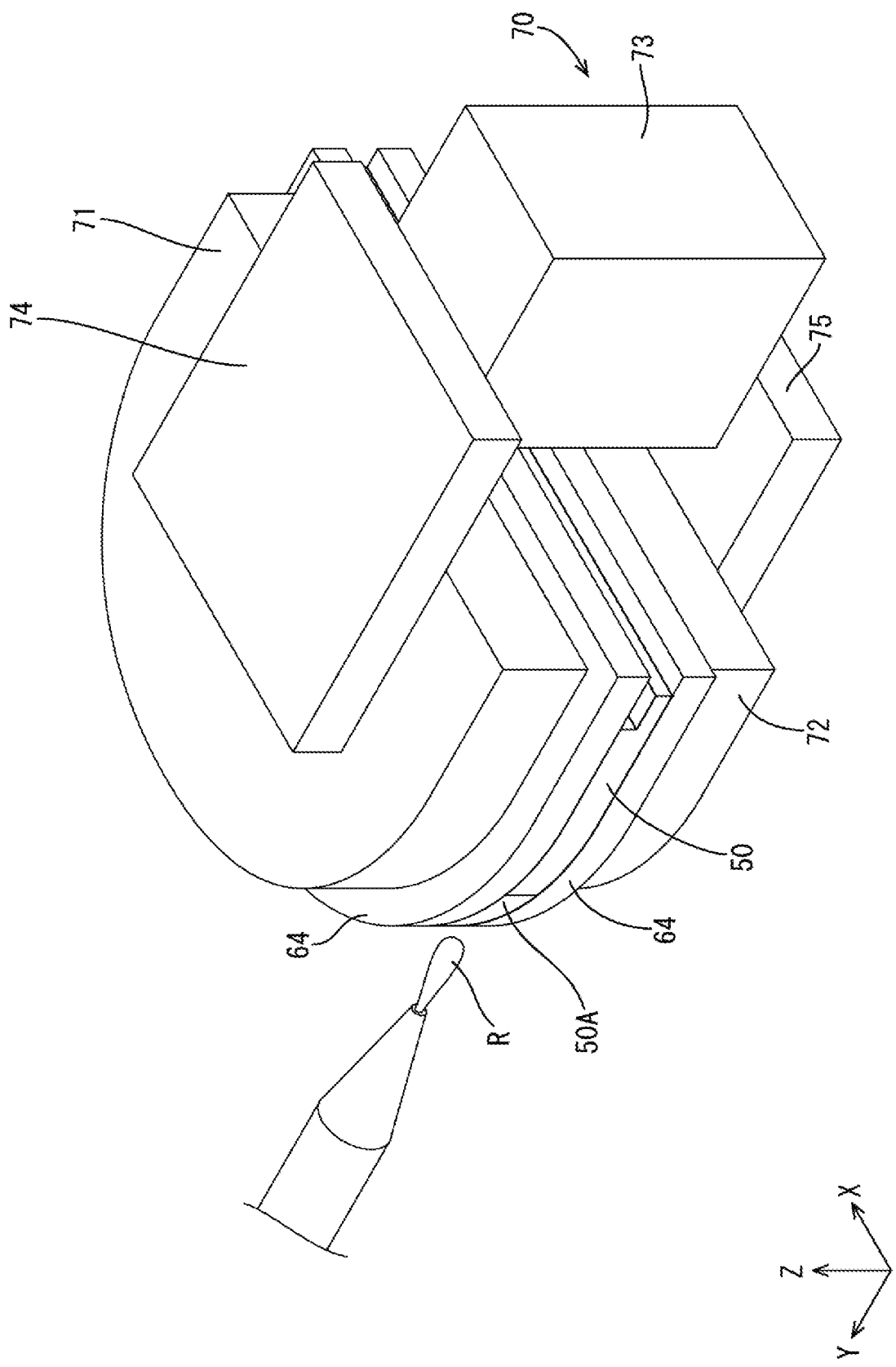
FIG. 11 is an explanatory view illustrating a process of sealing a sealing member removed processed edge section of the common liquid crystal panel formed through grinding with a secondary sealing member.

FIG. 11 is an explanatory view illustrating a process of sealing a sealing member removed processed edge section 50A of the common liquid crystal panel 50 formed through the grinding with a secondary sealing member. A sealing resin R is applied to the sealing member removed processed edge section 50A. The sealing resin R may be a photo-curable acrylic resin. The photo-curable acrylic resin may be the same resin that is normally used to seal a filling port of a liquid crystal panel after liquid crystals are inserted into the liquid crystal panel through vacuum injection. Such a photo-curable acrylic resin has an advantage such as less contamination of a liquid crystal layer.

The sealing resin R in an uncured state is applied to the sealing member removed processed edge section 50A to surround the liquid crystal layer (the liquid crystal layer 18) together with the primary sealing members 41 that remain without being removed from the sealing member 54. As illustrated in FIG. 11, when the sealing resin R is applied to the sealing member removed processed edge section 50A, the common liquid crystal panel 50 is held by the clamping jig 70 and under pressure in the thickness direction.

After the sealing resin R is applied to the sealing member removed processed edge section 50A, ultraviolet rays are applied to the sealing resin R and the sealing resin R is cured (a curing process). It is preferable that the common liquid crystal panel 50 is removed from the clamping jig 70. When the common liquid crystal panel 50 to which the sealing resin R is applied is removed from the clamping jig 70 before the curing, the common liquid crystal panel 50 is released from the pressure in the thickness direction (the pressure is canceled). The uncured sealing resin R that is applied to the sealing member removed processed edge section 50A has flowability. Therefore, a space between the edge of the CF board 52 (the CF board 20) and the edge of the array board 53 (the array board 30) is filled with a part of the uncured sealing resin R which flows into the space. When the sealing resin R is eventually cured, the cured section, which is the secondary sealing member 42, forms the sealing member 40 having the frame shape along the semicircular outline together with the primary sealing members 41.

The process of applying the sealing resin to the sealing member removed processed edge section 50A to fill the space between the edges of the boards (the CF board 52 and the array board 53) to seal the liquid crystal layer 51 (the liquid crystal layer 18) together with the rest of the sections of the sealing member (the primary sealing members 41) is referred to as the sealing process.

Figure 12:
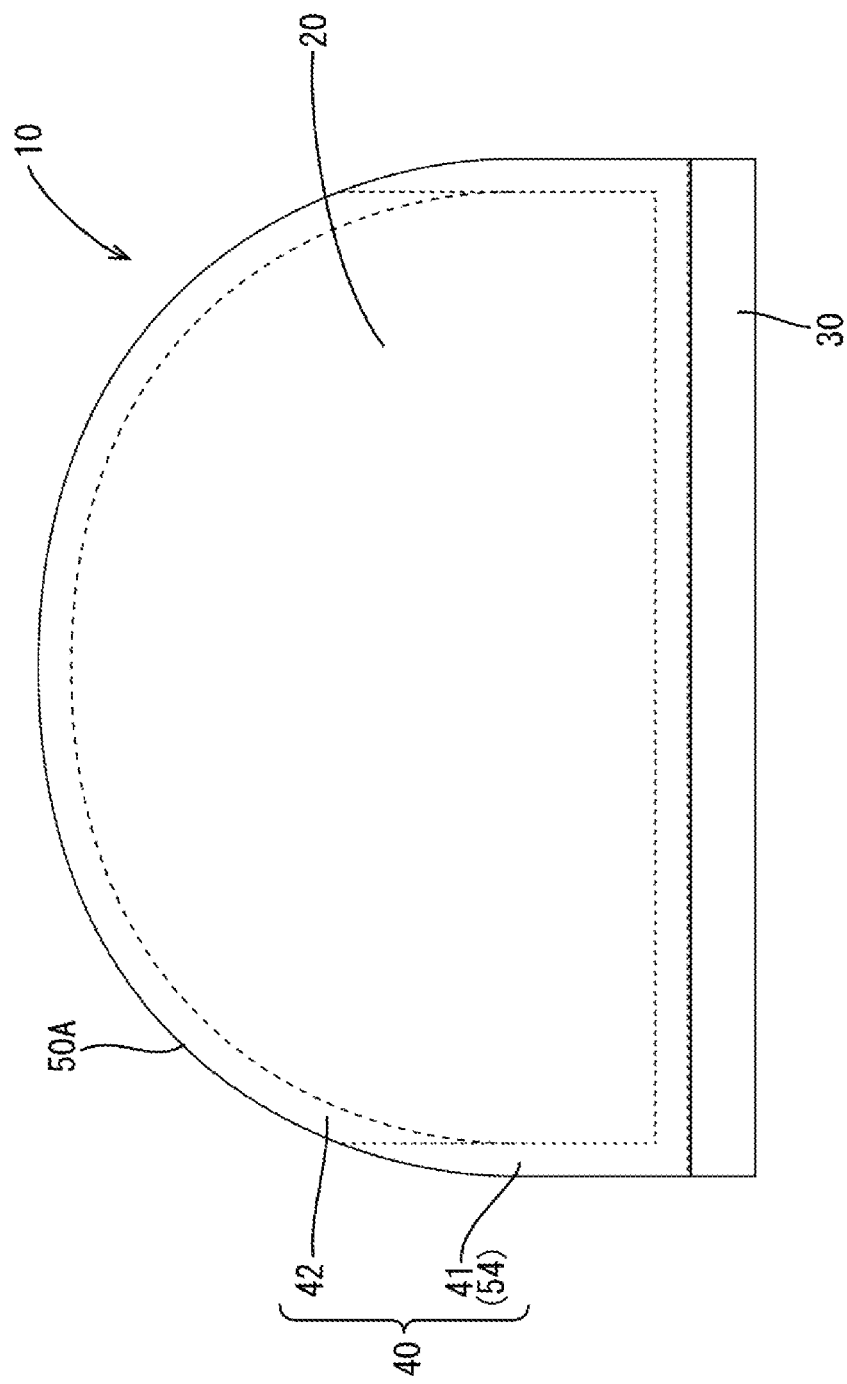
FIG. 12 is a plan view of the liquid crystal panel prepared by sealing the sealing member removed processed edge section of the common liquid crystal panel with a sealing resin.

FIG. 12 is a plan view of the liquid crystal panel 10 prepared by sealing the sealing member removed processed edge section 50A of the common liquid crystal panel 50 with a sealing resin R. As illustrated in FIG. 12, the sealing member 40 in the liquid crystal panel 10 has the frame-like overall shape along the outline of the liquid crystal panel 10 (the outline of the CF board 20). A section of the sealing member 40 disposed in the rectangular section of the liquid crystal panel 10 is formed from a section of the sealing member 54 in the common liquid crystal panel 50. The section of the sealing member 40 disposed in the semicircular section of the liquid crystal panel 10 is mainly formed from the secondary sealing member 42 that is prepared by curing the sealing resin R.

As described above, the liquid crystal panel 10 having the semicircular shape is produced from the common liquid crystal panel 50 having the rectangular shape using the clamping jig 70.

Second Embodiment

Figure 13:
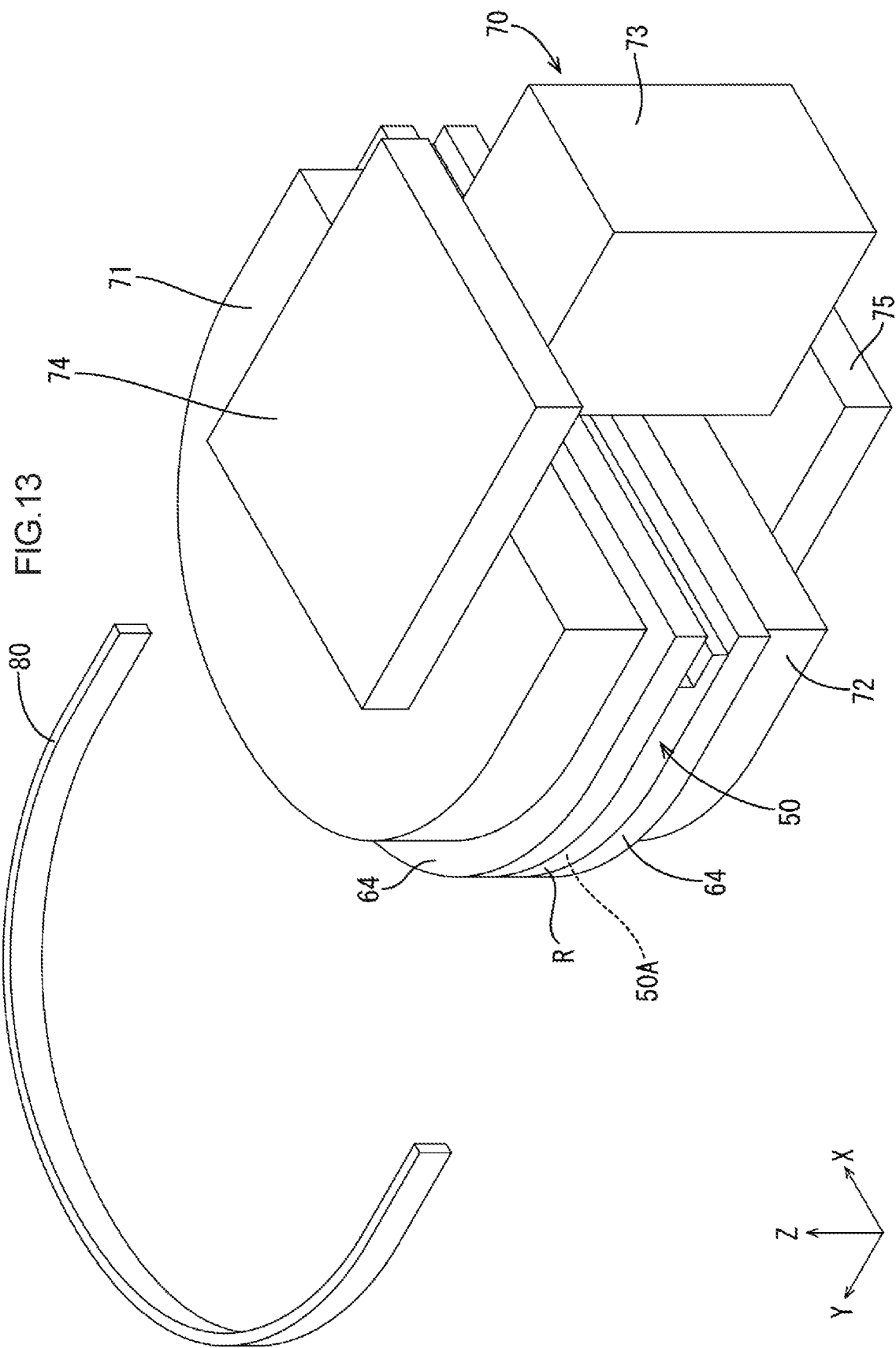
FIG. 13 is an explanatory view illustrating a process of attaching a moisture barrier to a sealing member removed processed edge section of a common liquid crystal panel held with the clamping jig formed through grinding with a sealing resin in a method of producing a liquid crystal panel according to a second embodiment.
Figure 14:
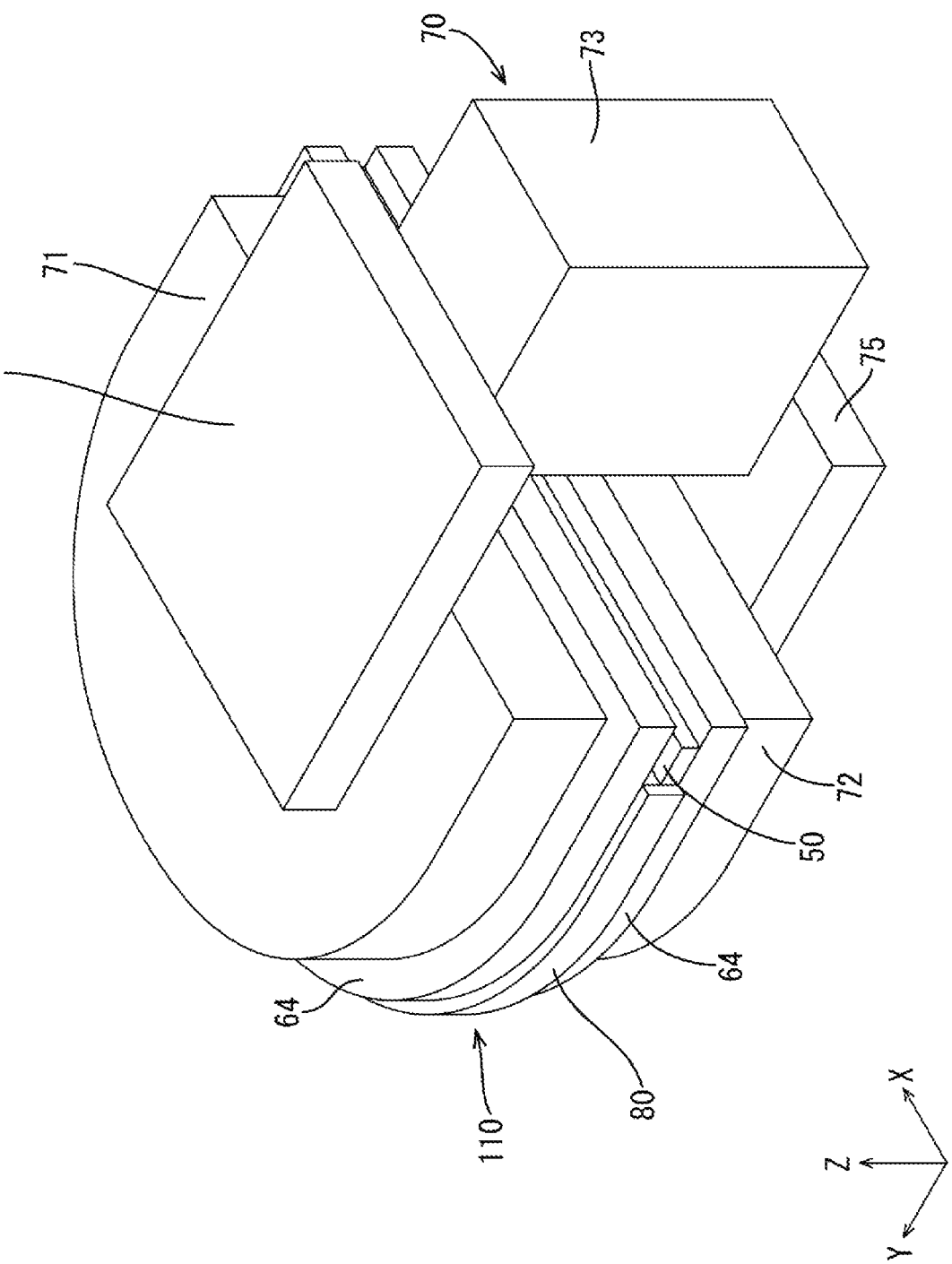
FIG. 14 is a perspective view of the liquid crystal panel including the moisture barrier to the sealing member removed processed edge section of the common liquid crystal panel held with the clamping jig after the grinding with the sealing resin R.

A second embodiment of the present invention will be described with reference to FIGS. 13 to 15. In this embodiment section, a method of producing a liquid crystal panel 110 having a semicircular shape and including a sealing member removed processed edge section 50A to which a moisture barrier is attached will be described. In this embodiment section and the following embodiment sections, components that are the same as those of the first embodiment will be indicated by the same symbols and will not be described.

The method of producing the liquid crystal panel 110 in this embodiment includes a moisture barrier attaching process in addition to the processes of the first embodiment (including the grinding process and the sealing process). The moisture barrier attaching process includes attaching the moisture barrier to the sealing member removed processed edge section 50A. FIG. 13 is an explanatory view illustrating the process of attaching a moisture barrier 80 to the sealing member removed processed edge section 50A of the common liquid crystal panel 50 held with the clamping jig 70 formed through grinding with the sealing resin R in the method of producing the liquid crystal panel 110 according to the second embodiment. FIG. 14 is a perspective view of the liquid crystal panel 110 including the moisture barrier 80 to the sealing member removed processed edge section 50A of the common liquid crystal panel 50 held with the clamping jig 70 after the grinding with the sealing resin R.

The moisture barrier 80 is for blocking moisture or liquid that may enters from the outside into the liquid crystal layer 51 in the common liquid crystal panel 50. The moisture barrier 80 is a band shaped moisture resistant member having flexibility. The moisture barrier 80 can be deformed along the sealing member removed processed edge section 50A that includes a curved surface. The moisture barrier 80 may be a ribbon made of glass ("glass-ribbon" manufactured by Nippon Electric Glass Co., Ltd.). In this embodiment, a glass ribbon having a thickness of 50 µm and a width of 1.3 mm is used for the moisture barrier.

The acrylic-based resin used for the sealing resin R generally has high ability to seal the sealing member removed processed edge section 50A. However, the acrylic-based resin tends to absorb moisture or liquid. Therefore, the moisture or the liquid from the outside may pass through the sealing resin R and enter into the liquid crystal layer 51. If the moisture enters into the liquid crystal layer 51 (the liquid crystal layer 18), display failure may occur in the liquid crystal panel 110. To properly block the moisture, the moisture barrier 80 is attached to the outer side of the sealing resin R in this embodiment.

If the sealing resin R is a photo-curable (ultraviolet curable) acrylic-based resin, the moisture barrier 80 is attached to the sealing resin R before the sealing resin R that is applied to the sealing member removed processed edge section 50A is cured. With the moisture barrier 80 attached to the sealing resin R, light (ultraviolet ray) is applied to the sealing resin R through the moisture barrier 80. As a result, the sealing resin is cured and the moisture barrier 80 is fixed to the sealing resin R.

The moisture barrier 80 includes a section that covers at least the sealing member removed processed edge section 50A, which is the section of the processed edge of the common liquid crystal panel 50 formed through the grinding, with the section of the sealing member 54 removed such that the liquid crystal layer 51 is exposed. In this embodiment, the moisture barrier 80 is attached to the processed edge of the common liquid crystal panel 50 to entirely cover the processed edge having the semicircular arc shape of the common liquid crystal panel 50 formed through the grinding.

The sealing resin R is applied to the entire area of the processed edge. The moisture barrier 80 is attached to the processed edge of the common liquid crystal panel 50 with the sealing resin R. In this embodiment, the sealing resin R is applied to sections of the edges of the common liquid crystal panel 50 in which the sealing members 54 remain and the liquid crystal layer 51 is not exposed to fix the moisture barrier 80.

Figure 15:
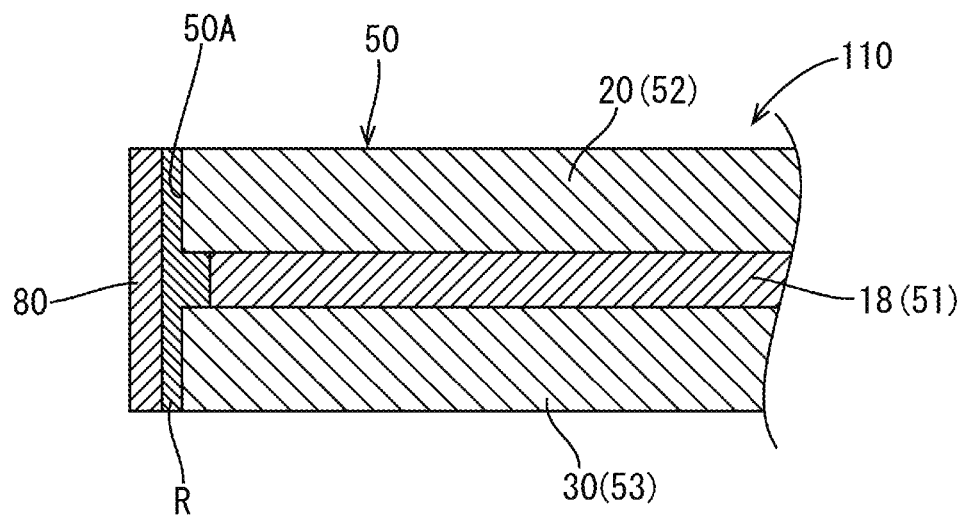
FIG. 15 is a cross-sectional view of the sealing member removed processed edge section and therearound of the liquid crystal panel according to the second embodiment.

FIG. 15 is a cross-sectional view of the sealing member removed processed edge section 50A and therearound of the liquid crystal panel 110 according to the second embodiment. As illustrated in FIG. 15, the sealing member removed processed edge section 50A of the liquid crystal panel 110 is sealed with the sealing resin R. Furthermore, the moisture barrier 80 blocks entry of moisture. A width of the moisture barrier 80 is defined larger than a gap between the CF board 20 (the CF board 52 of the common liquid crystal panel 50) and the array board 30 (the array board 53 of the common liquid crystal panel 50). In this embodiment, the width of the moisture barrier 80 is about equal to the thickness of the liquid crystal panel 110.

As described above, the moisture barrier 80 can be attached to the processed edge of the liquid crystal panel 110 (including the sealing member removed processed edge section 50A). If the adhesiveness of the sealing resin in other embodiments is low, the adhesive may be applied onto the sealing resin R and the moisture barrier 80 may be attached to the sealing resin R.

Third Embodiment

Figure 16:
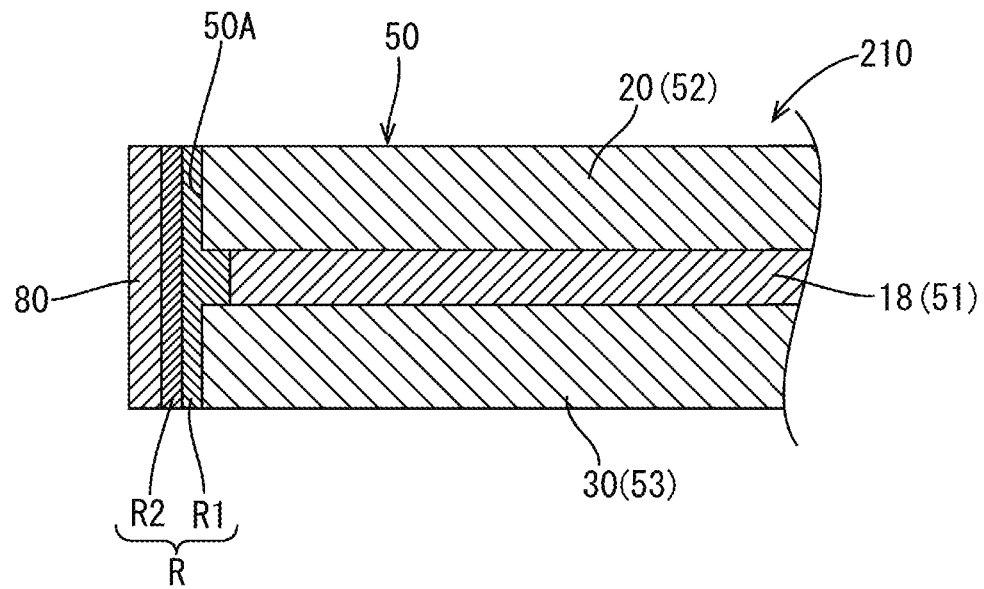
FIG. 16 a cross-sectional view of a sealing member removed processed edge section and therearound of a liquid crystal panel according to the third embodiment.

A third embodiment of the present invention will be described with reference to FIG. 16. FIG. 16 a cross-sectional view of a sealing member removed processed edge section 50A and therearound of a liquid crystal panel 210 according to the third embodiment. In this embodiment, the sealing resin R includes an acrylic-based resin R1 and an epoxy-based resin R2. The acrylic-based resin R1 is directly applied to the sealing member removed processed edge section 50A. The epoxy-based resin R2 is applied to be layered on the acrylic-based resin R1. Furthermore, the moisture barrier 80 is attached to the sealing member removed processed edge section 50A via the sealing resin R.

The acrylic-based resin R1 (e.g., a photo-curable acrylic resin) used for the sealing resin R has high ability to seal the processed edge (the sealing member removed processed edge section 50A) of the common liquid crystal panel 50. However, the acrylic-based resin R1 tends to absorb moisture or liquid. Therefore, the sealing resin R includes the acrylic-based resin R1 and the epoxy-based resin R2 having high moisture resistance (e.g., a photo-cationic polymerization epoxy resin). The acrylic-based resin R1 is used to fill the space between the CF board 20 (the CF board 52 of the common liquid crystal panel 50) and the array board 30 (the array board 53 of the common liquid crystal panel 50). The epoxy-based resin R2 is used to block the entrance of the moisture or the liquid from the outside into the liquid crystal layer 51 (18).

Furthermore, in this embodiment, the moisture barrier 80 having high moisture resistance is attached to the sealing resin R having a multilayer structure as described above. The liquid crystal panel 210 having such a configuration has higher moisture resistance in comparison to the liquid crystal panel 10 in the first embodiment and the liquid crystal panel 110 in the second embodiment. The moisture barrier 80 is bonded to the epoxy-based resin R2 of the sealing resin R. The moisture barrier 80 is attached to the sealing resin R before the epoxy-based resin R2 is cured. With the moisture barrier 80 attached to the epoxy-based resin R2, light (ultraviolet ray) is applied to the epoxy-based resin R2 through the moisture barrier 80. As a result, the epoxy-based resin R2 is cured and the moisture barrier 80 is fixed to the sealing resin R (the epoxy-based resin R2).

As described above, the sealing resin R may include different kinds of resins and the resins are applied to the sealing member removed processed edge section 50A to form multi layers. Alternatively, a combination of a sealing resin having high adhesiveness (high sealing ability) such as an acrylic-based resin R1 described above and a sealing resin having high moisture resistance (high waterproof ability) such as an epoxy-based resin R2 described above may be used. The moisture barrier 80 may be attached to the sealing resin R.

Fourth Embodiment

Figure 17:
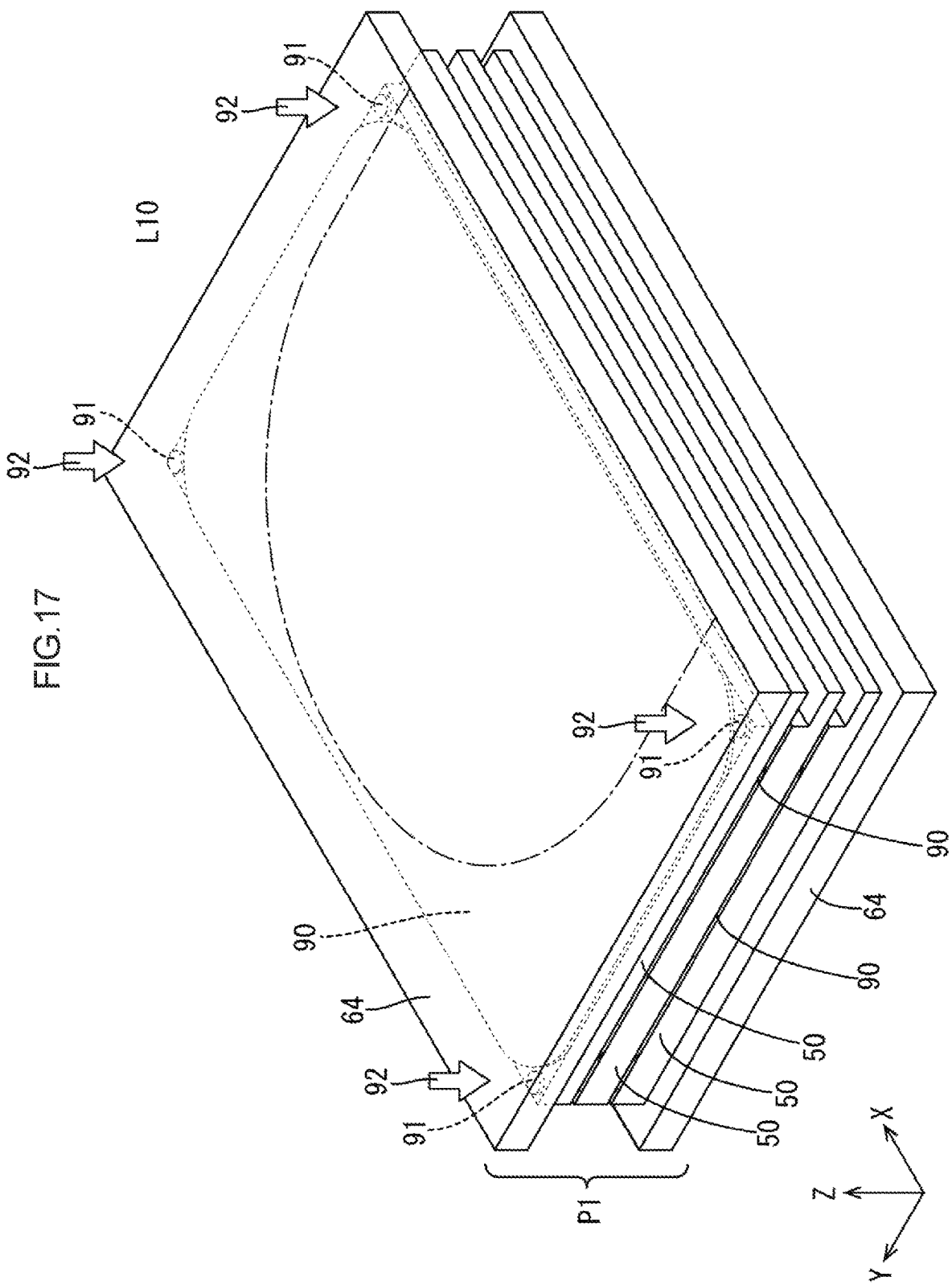
FIG. 17 is a perspective view of a panel laminate used in a method of producing a liquid crystal panel according to a forth embodiment.
Figure 18:
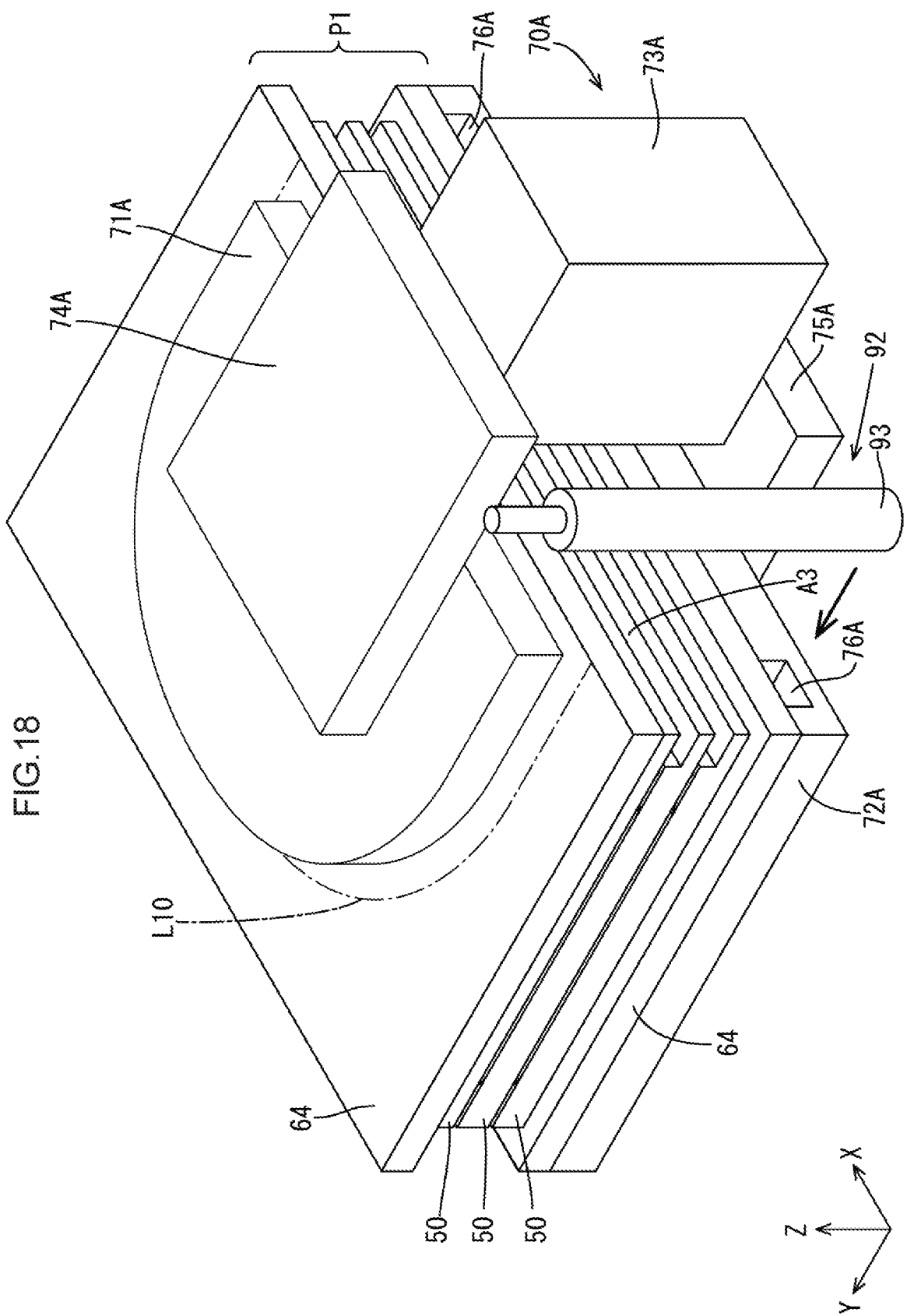
FIG. 18 is an explanatory view illustrating a grinding process of the method of producing a liquid crystal panel according to the fourth embodiment.

A fourth embodiment will be described with reference to FIGS. 17 to 18. In this embodiment section, a method of performing the grinding process of the common liquid crystal panel 50 for producing the liquid crystal panel 10 described in the first embodiment section on the multiple number of the common liquid crystal panels 50 at the same time. FIG. 17 is a perspective view of a panel laminate P1 used in a method of producing the liquid crystal panel 10 according to the forth embodiment. FIG. 18 is an explanatory view illustrating the grinding process of the method of producing the liquid crystal panel 10 according to the fourth embodiment.

In this embodiment, three (multiple) common liquid crystal panels 50 are placed on top of one another to be layered in the thickness direction. The common liquid crystal panels 50 are positioned while orientations of the common liquid crystal panels 50 are aligned. Sheets 90 such as slip sheets, resin sheets, and glass plates may be placed among the common liquid crystal panels 50 to protect front and back surfaces of the common liquid crystal panels 50. The sheets 90 may be placed among the dummy boards 64 and the common liquid crystal panels 50.

Each sheet 90 in this embodiment has a rectangular shape in a size about equal to the plate surface of the common liquid crystal panel 50. Corners of the sheet 90 are rounded. When the sheet 90 is placed on the corresponding common liquid crystal panel 50, corners of the common liquid crystal panel 50 are not covered with the sheet 90 and thus are exposed. Adhesives 91 are applied to the exposed corners of the common liquid crystal panel 50 to temporarily attach the corresponding dummy board 64 to the common liquid crystal panel 50 so that they are not displaced from each other. The adhesives 91 in this embodiment are ultraviolet curable type adhesives.

Areas of the common liquid crystal panel 50 in which the adhesives 91 are disposed are outside processing line L10 (a margin M). The adhesives 91 are removed from the common liquid crystal panel 50 together with the margin M in the grinding process. Therefore, a step for removing the adhesives 91 is not required. Furthermore, the adhesives 91 are less likely to contaminate the front and the back surfaces of the common liquid crystal panel 50.

The panel laminate P1 includes three (multiple) common liquid crystal panels 50 that are layered in the thickness direction and a pair of the dummy boards 64 that sandwich the common liquid crystal boards 50 in the vertical direction. The panel laminate P1 in this embodiment includes the sheets 90 that are placed among the common liquid crystal panels 50 and among the common liquid crystal panels 50 and the dummy boards 64 as described above.

To cure the adhesives 91, as illustrated in FIG. 17, spotlight (ultraviolet ray) is applied to the adhesives 91 through the upper dummy board 64 in the panel laminate P1. Because the common liquid crystal panels 50 are fixed (temporarily attached) to one another in the panel laminate P1, the panel laminate P1 can be easily attached to a predefined portion of the clamping jig.

In other embodiments, adhesives that may be cured with other method such as thermosetting adhesives may be used.

As illustrated in FIG. 18, the panel laminate P1 including the common liquid crystal panels 50 is held by a clamping jig 70A (a clamping device). The basic configuration of the clamping jig 70A in this embodiment is similar to that of the clamping jig 70 described earlier. The clamping jig 70A includes an upper plate 71A, a lower plate 72A, a post 73A, an upper connecting plate 74A, and a lower connecting plate 75A. The upper plate 71A and the lower plate 72A hold the panel laminate P1 from the upper side and the lower side, respectively. The post 73A is disposed outer than the panel laminate P1 to extend in a direction in which layers of the panel laminate P1 are placed. The upper connecting plate 74A connects the top surface of the upper plate 71A to the upper end of the post 73A. The lower connecting plate 75A connects the bottom surface of the lower plate 72A to the lower end of the post 73A. In this description, the upper plate 71A and the lower plate 72A are holding portions to sandwich the common liquid crystal panel 50 that are sandwiched between the dummy boards 64 (the panel laminate P1).

The lower plate 72A of the clamping jig 70A in this embodiment has a rectangular shape in a plan view, which is different from the clamping jig 70 in the first embodiment. The size of the lower plate 72A is about equal to the size of the dummy boards 64 (the protective boards). The lower plate 72A includes a groove 76A that is formed in a semicircular arc shape (a U shape) along processing line L10 in an area of the upper surface of the lower plate 72A corresponding to an area outside processing line L10. The groove 76A is formed in a shape to surround the upper plate 74A and processing line L10 in the plan view. Ends of the groove 76A open on a mounting area A3 side of the common liquid crystal panel 50 (a post 73A side). A width of the groove 76A is larger than an outer diameter of a rotary grindstone 93 of a grinding device 92 so that a lower portion of the rotary grindstone 93 can enter the groove 63A.

In the grinding process, the panel laminate P1 held by the clamping jig 70A is ground with the rotary grindstone 93 of the grinding device 92 which moves along the groove 76A. With the rotary grindstone 93 that moves along the groove 76A, the common liquid crystal panels 50 are collectively ground. The upper plate 71A is formed in a semicircular shape. The shape and the size of the upper plate 71A are defined such that the upper plate 71A does not contact the rotary grindstone 93 that moves along the groove 76A.

By performing the grinding process collectively on the common liquid crystal panels 50 that are placed on top of one another, the liquid crystal panel 10 can be efficiently produced.

Not only the grinding process but also the sealing process may be performed collectively on the common liquid crystal panels 50 that are place on top of one another. In this case, it is preferable to use glass plates with a predefined thickness for sheets that are disposed among the common liquid crystal panels 50. The sheets, that is, the glass plates have an even thickness. Because a thickness of the glass plates is normally larger than thicknesses of slip sheets and resin sheets, the sheets that are the glass plates and disposed among the common liquid crystal panels 50 can maintain proper distances among the common liquid crystal panels 50. Therefore, the sealing resin R for sealing the sealing member removed processed edge section 50A is less likely to flow to the sealing member removed processed edge section 50A of the adjacent liquid crystal panel 10 and thus work efficiency in the sealing process improves.

Other Embodiments

The present invention is not limited to the above embodiments described in the above sections and the drawings. For example, the following embodiments may be included in technical scopes of the present invention.

(1) In each of the above embodiment sections, the liquid crystal panel having the irregular shape (the non-rectangular shape) with the outline that is in the semicircular shape in the plan view is described. However, the present invention is not limited to such a liquid crystal panel. For example, a liquid crystal panel 310 in FIG. 19, a liquid crystal panel 410 in FIG. 20, and a liquid crystal panel 510 in FIG. 21 may be produced from the common liquid crystal panels 50 used in the first embodiment.

Figure 19:
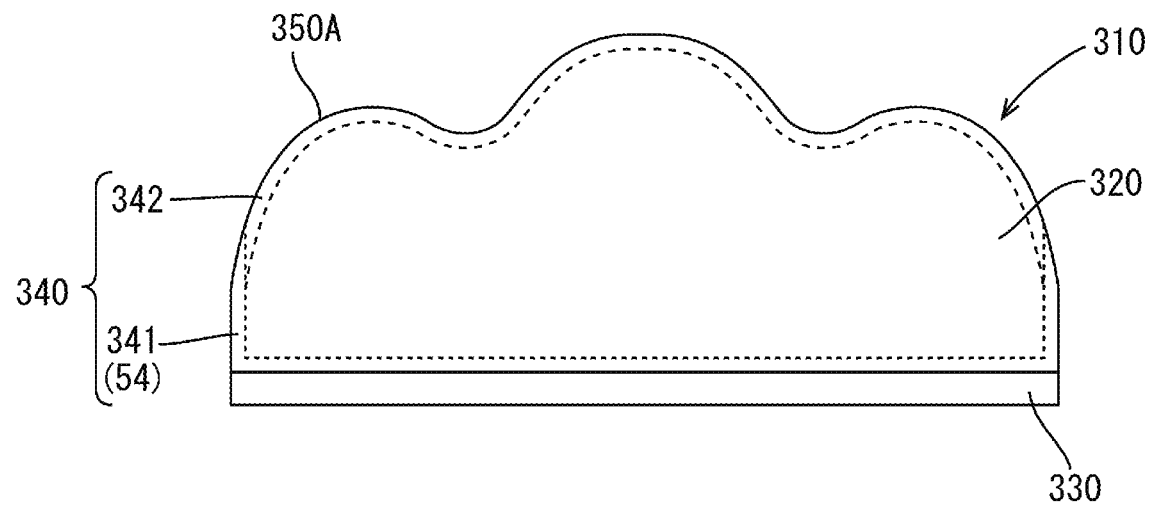
FIG. 19 is a plan view of a liquid crystal panel having an irregular shape according to other embodiments.

FIG. 19 is a plan view of the liquid crystal panel 310 having an irregular shape according to other embodiments. An upper section of the liquid crystal panel 310 has a curved outline and includes a wavy edge that includes multiple curves. A lower section of the liquid crystal panel 310 has an outline that is as if a section of a rectangular. A frame-shaped sealing member 340 that include round sections is disposed between a CF board 320 and an array board 330 of the liquid crystal panel 310. The sealing member 340 includes a primary sealing member 341 and a secondary sealing member 342. The primary sealing member 341 is a sealing member 54 that remains on the common liquid crystal panel 50 after the grinding process. The secondary sealing member 342 seals a curved sealing member removed processed edge section 350A that is formed through the grinding process performed on the common liquid crystal panel 50.

Figure 20:
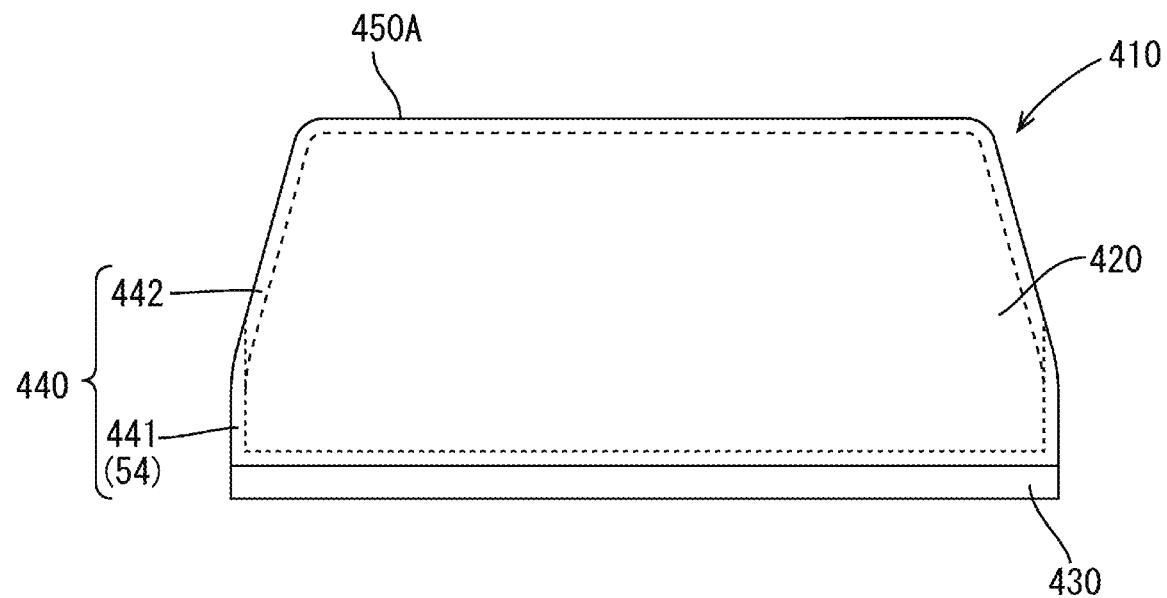
FIG. 20 is a plan view of a liquid crystal panel having an irregular shape according to other embodiments.

FIG. 20 is a plan view of the liquid crystal panel 410 having an irregular shape according to other embodiments. An upper section of the liquid crystal panel 410 has an outline that is as if a section of a trapezoid (an upper base section). A lower section of the liquid crystal panel 410 has an outline that is as if a section of a rectangular. A frame-shaped sealing member 440 that is formed in a trapezoidal shape is disposed between a CF board 420 and an array board 430 of the liquid crystal panel 410. The sealing member 440 includes a primary sealing member 441 and a secondary sealing member 442. The primary sealing member 441 is a sealing member 54 that remains on the common liquid crystal panel 50 after the grinding process. The secondary sealing member 442 seals a sealing member removed processed edge section 450A that is formed through the grinding process performed on the common liquid crystal panel 50.

Figure 21:
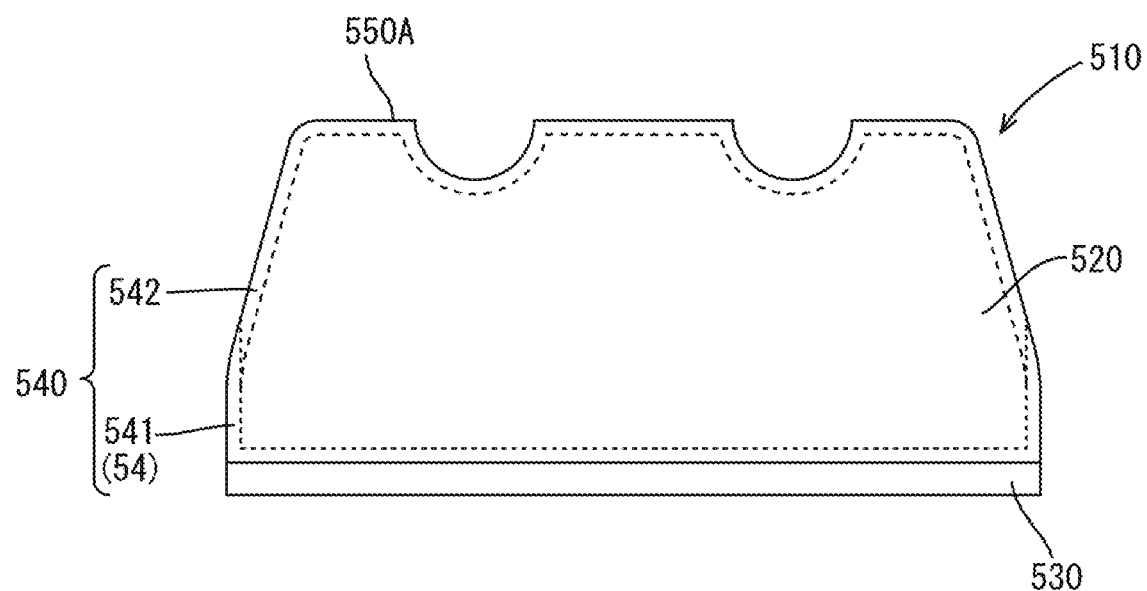
FIG. 21 is a plan view of a liquid crystal panel having an irregular shape according to other embodiments.

FIG. 21 is a plan view of the liquid crystal panel 510 having an irregular shape according to other embodiments. An upper section of the liquid crystal panel 510 has an outline that is as if a section of a trapezoid with an upper base that includes two round semicircular concaves. A lower section of the liquid crystal panel 510 has an outline that is as if a section of a rectangular. A frame-shaped sealing member 540 that is formed in a trapezoidal shape with an upper base that includes two round semicircular concaves is disposed between a CF board 520 and an array board 530 of the liquid crystal panel 510. The sealing member 540 includes a primary sealing member 541 and a secondary sealing member 542. The primary sealing member 541 is a sealing member 54 that remains on the common liquid crystal panel 50 after the grinding process. The secondary sealing member 542 seals a sealing member removed processed edge section 550A that is formed through the grinding process performed on the common liquid crystal panel 50.

(2) In the grinding process in the first embodiment, the clamping jig 70A used in the fourth embodiment may be used.

(3) In each of the above embodiment sections, the grinding method that uses the grinding device is described. However, other grinding methods and grinding devices may be in the grinding processes.

(4) In each of the above embodiment sections, the common liquid crystal panels having the rectangular plan view shapes are described. However, the present invention is not limited to such common liquid crystal panels. Liquid crystal panels having non-rectangular shapes and including non-rectangular shaped sealing members may be used for common liquid crystal panels to produce liquid crystal panels having various irregular shapes.

EXPLANATION OF SYMBOLS

10: Liquid crystal panel in an irregular (non-rectangular) shape
18: Liquid crystal layer
20: CF board
30: Array board
40: Sealing member
41: Primary sealing member
42: Secondary sealing member
50: Common liquid crystal panel
50A: Sealing member removed processed edge section
51: Liquid crystal layer in common liquid crystal panel
52: CF board in common liquid crystal panel
53: Array board in common liquid crystal panel
54: Sealing member in common liquid crystal panel
60: Mother common liquid crystal panel
64: Dummy board (Protective board)
70: Clamping jig (Clamping device)
80: Moisture barrier
90: Sheet
91: Adhesive
92: Grinding device
93: Rotary grindstone

The invention claimed is:

1. A method of producing a liquid crystal panel having a non-rectangular outline, the method comprising:
   a grinding process including:
      grinding at least one common liquid crystal panel including a liquid crystal layer, a pair of boards opposed to each other to sandwich the liquid crystal layer, and a frame-shaped sealing member sandwiched between the boards to fix the boards and surrounding the liquid crystal layer to seal the liquid crystal layer along a processing line defined along the non-rectangular outline to remove a section of the sealing member and to leave a rest of the sealing member; and
      forming a sealing member removed processed edge section of the common liquid crystal panel such that the liquid crystal layer is exposed, the sealing member removed processed edge section including edges of the boards corresponding to the section of the sealing member removed from the common liquid crystal panel; and
   a sealing process including applying a sealing resin to the sealing member removed processed edge section to fill a space between the edges of the boards to seal the liquid crystal layer together with the rest of the sealing member.

2. The method of producing a liquid crystal panel according to claim 1, wherein the grinding process includes grinding the common liquid crystal panel that is sandwiched and held in a thickness direction of the common liquid crystal panel along the processing line.

3. The method of producing a liquid crystal panel according to claim 2, wherein the grinding process includes holding the common liquid crystal panel by a clamping device that includes a pair of holding portions to be sandwiched between the holding portions in the thickness direction.

4. The method of producing a liquid crystal panel according to claim 2, wherein the grinding process includes sandwiching the common liquid crystal panel between protective boards, holding the common liquid crystal panel and the protective boards together, and grinding the common liquid crystal panel together with the protective boards along the processing line.

5. The method of producing a liquid crystal panel according to claim 1, wherein the sealing process includes a curing process that includes applying the sealing resin that is any one of a thermosetting resin, a photo-curable resin, and a thermosetting and photo curable resin cured by heat and/or light and in an uncured state to the sealing member removed processed edge section and applying the heat and/or the light to the sealing resin to cure the sealing resin in the uncured state.

6. The method of producing a liquid crystal panel according to claim 5, wherein
   the sealing process includes applying the sealing resin to the sealing member removed processed edge section of the common liquid crystal panel that is sandwiched to be under pressure in the thickness direction, and
   the curing process includes applying the heat and/or the light to the sealing resin in the common liquid crystal panel that is released from the pressure in the thickness direction.

7. The method of producing a liquid crystal panel according to claim 1, wherein
   the sealing resin used in the sealing process includes a plurality of kinds of sealing resins, and
   the sealing process includes applying the sealing resins to the sealing member removed processed edge section to form multiple layers.

8. The method of producing a liquid crystal panel according to claim 7, wherein the sealing resins used in the sealing process include an acrylic-based resin that is directly applied to the sealing member removed processed edge section and an epoxy-based resin that is applied to over the acrylic-based resin.

9. The method of producing a liquid crystal panel according to claim 1, further comprising a moisture barrier attaching process including attaching a moisture barrier having an elongated shape to at least the sealing member removed processed edge section of the common liquid crystal panel, the moisture barrier including a section to cover at least the sealing member removed processed edge section and having moisture resistance and flexibility.

10. The method of producing a liquid crystal panel according to claim 9, wherein the moisture barrier used in the moisture barrier attaching process is a glass ribbon.

11. The method of producing a liquid crystal panel according to claim 1, wherein
   the at least one common liquid crystal panel includes a plurality of common liquid crystal panels, and
   the grinding process includes collectively grinding the plurality of common liquid crystal panels that are layered in the thickness direction.

12. The method of producing a liquid crystal panel according to claim 11, wherein the grinding process includes fixing the plurality of common liquid crystal panels together with adhesives disposed between the common liquid crystal panels not to be displaced from each other.

13. The method of producing a liquid crystal panel according to claim 12, wherein the grinding process includes applying the adhesives to areas of the common liquid crystal panel outside the processing line.

14. The method of producing a liquid crystal panel according to claim 1, further comprising:
   a mother common liquid crystal panel producing process including producing a mother common liquid crystal panel including a plurality of common liquid crystal panels of the at least one common liquid crystal panel, the plurality of common liquid crystal panels being arranged in a matrix; and
   a singulation process including cutting the mother common liquid crystal panel into the common liquid crystal panels to obtain the plurality of common liquid crystal panels.

15. The method of producing a liquid crystal panel according to claim 1, wherein one of the boards of the at least one common liquid crystal panel is an array board including a plurality of gate drivers monolithically fabricated and disposed to be decentralized inside the frame-shaped sealing member.

* * * * *